(12) United States Patent
Grechanik et al.

(10) Patent No.: US 8,898,100 B2
(45) Date of Patent: Nov. 25, 2014

(54) TESTING FOR RULE-BASED SYSTEMS

(75) Inventors: Mark Grechanik, Chicago, IL (US); Chen Fu, Lisle, IL (US)

(73) Assignee: Accenture Global Services Limited, Dublin (IE)

( * ) Notice: Subject to any disclaimer, the term of this patent is extended or adjusted under 35 U.S.C. 154(b) by 339 days.

(21) Appl. No.: 13/250,348

(22) Filed: Sep. 30, 2011

(65) Prior Publication Data

US 2013/0085979 A1 Apr. 4, 2013

(51) Int. Cl.
*G06N 5/02* (2006.01)

(52) U.S. Cl.
CPC ............................... *G06N 5/025* (2013.01)
USPC ............................................................ 706/48

(58) Field of Classification Search
CPC ...................................................... G06N 5/025
USPC ............................................................ 706/48
See application file for complete search history.

(56) References Cited

U.S. PATENT DOCUMENTS 5,442,792 A * 8/1995 Chun .......................... 717/155

OTHER PUBLICATIONS

Ramaswamy et al., Using directed hypergraphs to verify rule-based expert systems, IEEE Transactions on Knowledge and Data Engineering, vol. 9, No. 2, Mar.-Apr. 1997.*
Avritzer et al., Reliability testing of rule-based systems, International Symposium on Software Reliability Engineering, 1996.*
Wu and Lee, A token-flow paradigm for verification of rule-based expert systems, IEEE Transactions on Systems, Man and Cybernetics, vol. 30, No. 4 (2000).*
Fu and Fu, Mapping rule-based systems into neural architecture, Knowledge-Based Systems, vol. 3, Issue 1 (1990).*
Kiper, Structural testing of rule-based expert systems, ACM Transactions on Software Engineering and Methodology, vol. 1, No. 2 (1992).*
Kim et al., Test cases generation from UML state diagrams, IEE Proc.-Softw., vol. 146, No. 4 (1999).*
Biermann et al., Graphical definition of in-place transformations in the eclipse modeling framework, Model Driven Engineering Languages and Systems, LNCS 4199, pp. 425-439 (2006).*

* cited by examiner

*Primary Examiner* — Kakali Chaki
*Assistant Examiner* — Michael Zidanic
(74) *Attorney, Agent, or Firm* — Finnegan, Henderson, Farabow, Garrett & Dunner, LLP

(57) ABSTRACT

A non-transitory computer-readable medium tangibly embodied in a storage device encoded with instructions that, when executed on a processor, perform a method in a computer system for testing a rule-driven system, the method comprising detecting a potential read-write error or a potential write-write error in the rule-driven system, generating test results based on the detecting, and reporting the test results.

35 Claims, 40 Drawing Sheets

```
 1   RULE SPEC ID: SVFF506D897
 2   RULE LONG NAME: Delete Patient
 3   SYSTEM NAME: DLTE_CONTAINERS
 4   KIND: REQUEST_BEHAVIOR_KIND
 5   PARENT ID:
 6       NAME: CASE.PATIENT.DISCHARGED
 7   ARG PATH: CASE.PATIENT.CONTACT
 8   ARG PATH: CASE.PATIENT.APPOINTMENTS
 9   ARG PATH: CASE.PATIENT.NUM_VISITS
10   SOURCE
11   Receives
12       Container1 Boolean
13       ContainerArray() Boolean
14       num_visits
15   Uses i integer
16       Container1 = false
17       for i = 1 to ubound(ContainerArray)
18           ContainerArray(i) = false
19       next
20       num_visits = 0
```

FIG. 6

```
<rule>
<ruleSpecId>LFZ7P23F000</ruleSpecId>
<ruleLongName>
RULE LONG NAME: Apply for Aid Read
</ruleLongName>
<systemName>APPLY_FOR_AID_READ</systemName>
<kind>IS_READ_ONLY_KIND</kind>
<parent id="1" name="CASE"/>
<argpaths>
<argpath path="CASE">
<properties>
<property>STATUS</property>
</properties>
</argpath>
</argpaths>
<source>1720</source>
<methodName>
LFZ7P23F000APPLY_FOR_AID_READCASE
</methodName>
</rule>
```

FIG. 7

```
systemNameDeclaration returns[String xmlString]:
{$xmlString = "<systemName>";}
SYSTEM_NAME
(INTEGER_LITERAL{$xmlString += $INTEGER_LITERAL.text;})?
  (IDENTIFIER{ String s = "";
    s = removeChar($IDENTIFIER.text,'`');
    s = removeChar(s,'/');
    $rule::methodName += s;
    $xmlString += $IDENTIFIER.text;})?
{$xmlString += "</systemName>\n";}
;
```

FIG. 8

```
public class SymbolEntry {
    private String variableName = "";
    private Type type;
    private boolean isProperty;
    private int dimension;
    ...
} public class SymbolTable {
    private ArrayList<SymbolEntry> symbolTable;
    ...
    public Type findEntryType(String variableName) {
        Type type = Type.NULL;
        for (SymbolEntry s : symbolTable) {
            if (s.getVariableName()==variableName){
                type = s.getType();
                break;
            }
        }
        return type;
    }
}
```

FIG. 10

```
NOT_EQUAL {
  isNotEqualFound = true;
  if(!isFrontString && !isFrontDate
      && !isFrontPercentage)
    SjavaString += "!=";
  else{
    //call to method compareTo
    SjavaString += ".compareTo(";
  }
}
```

FIG. 11

```
if(isFrontString||isFrontDate
   ||isFrontPercentage){
  $javaString += ")";
  if(isNotEqualFound)
    $javaString += "!= 0";
  else if(isAssignFound)
    $javaString += "== 0";
  else if(isLtFound)
    $javaString += "< 0";
  else if(isLeFound)
    $javaString += "<= 0";
  else if(isGtFound)
    $javaString += "> 0";
  else if(isGeFound)
    $javaString += ">= 0";
}
```

FIG. 12

```
protected void merge(Object in1, Object in2,
    Object out) {
    // personalized implementation
} protected void copy(Object source, Object dest) {
    // personalized implementation
}
```

FIG. 14

```
protected void flowThrough(Object in, Object node,
        Object out) {
    kill(in, u, out);
    gen(out, u);
}
```

FIG. 15

```
protected Object entryInitialFlow () {
  return entrySet;
}
protected Object newInitialFlow () {
  return initialSet ();
}
```

FIG. 16

```
protected void copy(Object source, Object dest) {
    FlowSet sourceSet = (FlowSet) source;
    FlowSet destSet = (FlowSet) dest;
    sourceSet.copy(destSet);
}
```

FIG. 19

```
protected void merge(Object in1, Object in2,
      Object out) {
   FlowSet inSet1 = (FlowSet)in1;
   FlowSet inSet2 = (FlowSet)in2;
   FlowSet outSet = (FlowSet)out;
   inSet1.intersection(inSet2, outSet);
}
```

FIG. 20

```
tempS0 = array;
tempS1 = i;
tempS2 = tempS0[tempS1];
tempS3 = j;
tempS4 = 2;
tempS2[tempS3] = tempS4;
```

FIG. 21

```
private String findValueWrittenIn(Unit u, ValueBox arrayBase) {
    // find the unit where the array base is defined
    DominatorsFinder df = new MHGDominatorsFinder(graph);
    Unit unitFound = null;
    for (Iterator domsIt = df.getDominators(u).iterator(); domsIt.hasNext();) {
        Unit dom = (Unit) domsIt.next();
        Iterator arrit = dom.getDefBoxes().iterator();
        while (arrit.hasNext()) {
            ValueBox arr = (ValueBox) arrit.next();
            if (arr.getValue().equals(arrayBase.getValue())) {
                unitFound = dom;
            }
        }
    }
    // Recursion
    if (((Stmt) unitFound).containsArrayRef()) {
        String s = findValueWrittenIn(unitFound, ((Stmt) unitFound)
            .getArrayRef().getBaseBox());
        return s;
    } else {
        String s1 = "";
        for (Iterator paramfoundIt = unitFound.getUseBoxes().iterator(); paramfoundIt.hasNext();) {
            ValueBox paramFound = (ValueBox) paramfoundIt.next();
            s1 += paramFound.getValue().toString();
        }
        return s1;
    }
}
```

FIG. 22

```
temp$0 = arraybase;
temp$1 = i;
temp$2 = 0;
temp$0[temp$1] = temp$2;
```

FIG. 23

```
private List<String> getArrayWrittenBases(UnitGraph g) {
    ...
    // For all the statements in the method body
    while (unitIt.hasNext()) {
        ...
        // if it is an assignment statement and contains an array
        if (st.containsArrayRef() && st instanceof AssignStmt) {
            while (defIt.hasNext()) {
                ValueBox defBox = (ValueBox) defIt.next();
                ...
                while (iI.hasNext()) {
                    ValueBox useBox = (ValueBox) iI.next();
                    // add the array base to the list
                    if (useBox.getValue().equals(
                            ((AssignStmt) st).getArrayRef().getBase()))
                        arrayBases.add(st.getArrayRef().getBase()
                                .toString());
                }
            }
        }
        // if it is a return statement and an array is returned add the base
        else if (st instanceof ReturnStmt) {
            arrayBases.add(findArrayBase(st,
                    ((ReturnStmt) st).getOpBox()));
        }
    }
    return arrayBases;
}
```

FIG. 24

```
if (u instanceof IfStmt) {
    ConditionExpr condition = (ConditionExpr) (((IfStmt) u).getCondition();
    ValueBox op1 = condition.getOp1Box();
    ValueBox op2 = condition.getOp2Box();
    String operator1 = new String();
    String operator2 = new String();
    operator1 = this.getSymbolicValue(u, op1);
    operator2 = this.getSymbolicValue(u, op2);

outbranch.add(operator1 + condition.getSymbol().trim() + operator2);

outfall.add(operator1 + this.getNegation(condition.getSymbol().trim()) + operator2);
}
```

FIG. 26

```
private String getNegation(String symbol) {
    if (symbol.compareTo("<") == 0)
        return ">=";
    else if (symbol.compareTo(">") == 0)
        return "<=";
    else if (symbol.compareTo("<=") == 0)
        return ">";
    else if (symbol.compareTo(">=") == 0)
        return "<";
    else if (symbol.compareTo("==") == 0)
        return "!=";
    else if (symbol.compareTo("!=") == 0)
        return "==";
    return null;
}
```

FIG. 27

```
private String getSymbolicValue(Unit u, ValueBox localVar) {
    String s1 = "";

//find the previous instruction where localVar is assigned
    ...
    if (previousInstruction instanceof AssignStmt) {
        if (rightOperand instanceof CallFunctionInvocation) {
            s1 += getSymbolicValue(rightOperand.getFirstVariable());
            s1 += "." + rightOperand.getFunctionName() + "(";
            // for each parameter get the its symbolic value
            for (parameter in rightOperand.getParameters()) {
                s1 += getSymbolicValue(previousInstruction.parameter);
            }
            s1 += ")";
        } else if (rightOperand instanceof ArrayReference) {
            s1 += getSymbolicValue(unitFound.rightOperand.getArrayBase());
            s1 += "[";
            s1 += getSymbolicValue(unitFound.rightOperand.getArrayIndex());
            s1 += "]";
        } else if (rightOperand instanceof BinopExpr) {
            s1 += getSymbolicValue(rightOperand.getFirstOperand());
            s1 += rightOperand.getSymbol();
            s1 += getSymbolicValue(unitFound.rightOperand.getSecondOperand());
        } else if (rightOperand instanceof Variable) {
            s1 += getSymbolicValue(unitFound. rightOperand);
        } else {
            s1 += rightOperand.toString();
        }
        ...
    }
}
```

FIG. 28

```
protected void merge(Object in1,
    Object in2, Object out) {
FlowSet inSet1 = (FlowSet) in1;
FlowSet inSet2 = (FlowSet) in2;
outSet = (FlowSet) out;
if (inSet1.isEmpty())
    inSet2.copy(outSet);
else if (inSet2.isEmpty())
    inSet1.copy(outSet);
else {
    if (PATHCONSTANT == 1)
        inSet1.copy(outSet);
    else
        inSet2.copy(outSet);
}
}
```

FIG. 29

```
public class Rule { private  String  ruleMethodName;
    private  String  kind;
    private  Property  parent;
    private  List<Property>  writtenVariables;
    private  List<Property>  readVariables;
    private  List<Property>  mayWrittenVariables;
    private  List<Property>  mayReadVariables;
} public class Property {
    private  String  variableName;
    private  String  fullPathName;
    private  List<String>  firstPathConditions;
    private  List<String>  secondPathConditions;
}
```

FIG. 32

```
public class PossibleConflict {
    private String parentProperty;
    private List<Rule> rules;
}
```

FIG. 33

```java
public List<PossibleConflict> getRConflicts() {

List<PossibleConflict> possibleConflicts =
        new ArrayList<PossibleConflict>();
    List<String> parents = this.parents;
    List<Rule> rules = this.rules;
    List<String> kinds = getReadTriggeredKinds();

for (String parent : parents) {
        PossibleConflict conflict =
            new PossibleConflict(parent);
        for (Rule r : rules) {
            // if it is a read Triggered Rule
            if (kinds.contains(r.getKind())) {
                // if it is attached to parent
                if (parent == r.getParent()) {
                    // initialize the rule properties
                    conflict.addRule(r);
                }
            }
        }
        if (conflict.containsAtLeastTwoRules()) {
            possibleConflicts.add(conflict);
        }
    }
}
```

FIG. 34

```
public class ConflictPair {
    private Rule rule1;
    private Rule rule2;
    private Property property1;
    private Property property2;
    private String actionRule1;
    private String actionRule2;
}
```

FIG. 35

```
<conflict>
<property>NAMED_SEQUENCE_NUMBER</property>
<rule1>
    <ruleMethodName>PPFM3049D00DLTE</ruleMethodName>
    <action>mayWrite</action>
    <pathCondition>
        [this..isNull(NAME_TYPE)==0,
        NAME_TYPE.compareTo("1")!=0]
    </pathCondition>
</rule1>
<rule2>
    <ruleMethodName>Y5XBF03Z700YR</ruleMethodName>
    <action>mayRead</action>
    <pathCondition>
        [this..isNull(NAME_TYPE)==0,
        NAME_TYPE.compareTo("1")!=0]
    </pathCondition>
</rule2>
</conflict>
```

FIG. 36

```
public class ConditionalEdge {
  private RuleNode source;
  private PropertyNode dest;
  private List<String> conditions;
}
```

FIG. 37

```
public class TriggeringGraph {
    protected Set<RuleNode> rules;
    protected Set<PropertyNode> properties;

protected Set<ConditionalEdge> ruleToPropertiesEdges;
    protected Map<PropertyNode, Set<RuleNode>> propertyToRulesEdges;
}
```

FIG. 38

TESTING FOR RULE-BASED SYSTEMS

TECHNICAL FIELD

The present disclosure relates to rule-driven applications (hereinafter referred to interchangeably as "RDAs" and "rule-driven systems") and rule-based expert systems (RBESs), and methods of testing rule-driven applications and RBESs.

BACKGROUND

RDAs based on RBESs are widely used in the development of computer applications for use in the fields of medicine, health, and financial services. In the United States, for example, fraud identification in credit card transactions is often done using RDAs based on RBESs. The market for RBES engines is currently estimated at approximately $300 Mil, and is expected to reach $500 Mil by 2013.

A classic example of an RDA or "rule-driven system" is a system of rules to make deductions or choices written in a high-level programming language. For example, an RDA might help a doctor choose the correct diagnosis based on a cluster of symptoms, or select tactical moves to play a game. RDAs based on RBESs allow program developers to represent programming logic using high-level rules described in declarative language (hereinafter referred to interchangeably as "RDA language" and "rule language") without worrying about low-level details of the execution of individual rules. In order to allow developers to avoid these low-level details, in fact, rule execution logic and the high-level declarative nature of rules are often completely separated in rule development. In other words, in many cases, new rules may be added to existing RBESs without making laborious and error-prone changes to underlying low-level rule logic.

FIG. 1 shows an overview of the organization of an exemplary RDA. It is to be understood that FIG. 1 is merely for illustrative purposes and that FIG. 1 is not meant as an exhaustive display of RDA features. The RDA 100 includes a rule base 10 which includes a plurality of rules and data that represents a "knowledge" or "expertise" of the RDA. An inference engine 20 (hereinafter referred to interchangeably as "inference engine" or "RBES engine") determines which rules from the rule base 10 are executed at any given time, as well as how to execute them. The inference engine 20 generally does not contain rules until they are added by developers of the RDA through a developer interface 30. Rather, the inference engine 20 generally contains only routines that specify how to execute rules and how to infer conclusions from results obtained from the execution of rules.

One of the major roles of the inference engine 20 is, for example, to determine which information, variables, and rules may be needed from the rule base 10 for the execution of a particular rule and to combine the information, variables, and rules in order to create new information and store the newly created information in a working memory 40. A user executes the RDA 100 through a user interface 50, as shown in FIG. 1.

Broadly, rules in RDA rule bases 10 may be instructions or commands that apply under certain conditions. Rules generally interact with variables, or "properties" (hereinafter, the terms "variable" and "property" may be used interchangeably in the context of the description of rules). For example, "A and B=>C" is a rule that may be "fired," "triggered," or "executed" (herein the terms "fired," "triggered," and "executed" may be used interchangeably) when values A and B are both present. Executing the rule stores a value C. The new value C generated by the rule may, for example, trigger the execution of other rules. Each of the triggered rules may produce new information, variables, or conditions, again possibly resulting in the execution of still more rules. In this way, the execution of a rule may lead to execution of a long chain of rules. Each of the executed rules may read from or write to variables in the system database. "Interferences" may arise when one rule in the execution chain alters a variable in a way that alters the execution of another rule.

When the conditions are such that more than one rule could be executed at a given time, different RBES engines may use different techniques to determine the execution sequence. Because of the different execution sequences, different RBESs may lead to different states or outcomes resulting from the same inputs. A simple example illustrates this in the case of two rules, rules 1 and 2:

if (PK==3){PN==2}                                                         rule 1:

if (PK==3){PN==3}                                                         rule 2:

"Operand1==operand2" is a relational expression using the operator "==" to determine if operand1 and operand2 are equal. If operand1 and operand2 are equal, the expression "operand1==operand2" returns a logical "TRUE." If operand1 and operand2 are not equal, the expression "operand1==operand2" returns a logical "FALSE."

When the condition "PK==3" is true, both rules 1 and 2 will fire. However, executing rule 1 first and rule 2 second will lead to a final condition where PN is equal to 3, while executing rule 2 first and rule 1 second will lead to a final condition in which PN is equal to 2. Therefore, different execution sequences, which vary from RBES to RBES, may result in different outcomes. Moreover, each rule may write to variables in a database that other rules use during execution. Different execution sequences may then cause rules to execute differently, again leading to different outcomes.

It is possible to test RDAs for interferences and to use the test results to eliminate the interferences. Much of the current effort in testing RDAs centers on checking the rules for consistency, completeness, and redundancy. The testing may often be made difficult by the sheer number of rules and the inherent complexity of their interaction. For example, if an RDA includes k rules that may be fired n times in response to a particular condition, each of these rules may contain up to $k^n$ distinct states or outcomes. Moreover, the inherent non-deterministic quality of RBESs adds to the complexity and resultant difficulty in testing.

RDA testing routines usually detect: (1) rule conflicts and (2) incompleteness. Conflicts arise when multiple rules have premises that may hold at the same time, shared variables, and/or other interactions that can cause inconsistent results. As described herein, conflicts may create non-deterministic behavior in a rule-driven application that may lead to different results when the application is executed. Incompleteness is a situation in which none of the rules in the rule base 10 can fire.

When two or more rules fire at the same time, it can be difficult or impossible to predict the actual execution sequence without a protracted analysis. To verify that a particular condition leading to a conflict is reached, it may be necessary to examine a large number of components and possible scenarios. This is because different rule execution sequences may lead to the condition in a plurality of different ways. Therefore, a way to identify possible conflicts arising in RDAs that deals with this complexity is desirable.

SUMMARY

Toward that end, it is desirable to determine, with a relatively high degree of automation and precision, where RDAs exhibit non-determinacy leading to unreliable behavior. One problem is to identify, at the time the rules and system are compiled, situations in which execution of rules can lead to read-write or write-write conflicts. The approach may detect read-write and write-write conflicts in a way that is automated and relatively precise. The approach may further output test cases whose execution will validate the existence of potential conflicts.

In one exemplary embodiment, there is provided a non-transitory computer-readable medium tangibly embodied in a storage device encoded with instructions that, when executed on a processor, perform a method in a computer system for testing a rule-driven system. The method comprises detecting a potential read-write error or a potential write-write error in the rule-driven system, generating test results based on the detecting, and reporting the test results.

In this exemplary embodiment, the detecting may further comprise constructing a representation of the rule-driven system, the representation including the at least one detected potential read-write error or potential write-write error. The generating may further comprise determining, via representation, a likelihood that the at least one detected potential error will be encountered during operation of the rule-driven system. The representation may also include a system dependence graph and the determining may further comprise symbolically executing rules of the rule-driven system. The detecting may further comprise mapping rules in the rule-driven system, written in a first language, to a second language. The first language may be a domain-specific language and the second language may be the JAVA programming language.

In another exemplary embodiment, there is provided a non-transitory computer-readable medium tangibly embodied in a storage device encoded with instructions that, when executed on a processor, perform a method in a computer system for testing a rule-driven system. The method comprises identifying, by the processor, rules in the rule-driven system; constructing a representation of the rule-driven system including the identified rules; identifying, using the representation variable reads and variable writes in the identified rules; identifying, using the representation, path conditions for the identified rules that lead to the variable reads and writes; identifying, using the path conditions, potential conflicts among the identified rules; and executing test cases based on the potential conflicts to determine a likelihood of encountering a detected error, or a likelihood that the potential conflicts may be encountered during operation of the rule-driven system.

In this exemplary embodiment, identifying potential conflicts may comprise identifying a potential conflict based on least one of a potential read-write error or a potential write-write error. Constructing a representation may further comprise mapping the identified rules from a domain-specific language to a second language and constructing a system dependence graph to represent the identified rules. The mapping may further comprise extracting header and body information from the identified rules, translating the header and body information into the second language, and storing the translated header and body information. The second language may be the JAVA programming language and the translating may further comprise translating the body information into a method of the JAVA programming language. The storing may further comprise storing the header information into a data structure. The translating may further comprise translating the body information into a method of the JAVA programming language by: assigning attribute types of the JAVA programming language corresponding to variables in the first language using a variable symbol table, assigning attribute types of the JAVA programming language corresponding to functions in the first language using a function symbol table. The storing may further comprise storing the method of the JAVA programming language as a string.

In this embodiment, the identifying variable reads and variable writes may further comprise using data flow analysis to identify variable reads and variable writes and generating a list of the identified variable reads and variable writes. Using data flow analysis may further comprise, for a first rule of the identified rules, identifying at least one of: a written variable and a portion of the first rule that writes to the written variable, or a read variable and a portion of the first rule that reads the read variable, and identifying a potential conflict when a second rule of the identified rules: writes to the read variable, or reads from the written variable.

In this embodiment, identifying a written variable may further comprise detecting at least one of: an assignment statement in the first rule involving the written variable, or a return statement in the first rule involving the written variable, and determining whether or not the at least one detected assignment statement or detected return statement writes to the written variable. The determining may comprise indicating a certainty that the at least one detected assignment statement or detected return statement will write to the written variable when the rule is executed. The determining may further comprise propagating an intermediate value of the written variable from a branch of a control flow graph to a merge node on the control flow graph, using a copy function, and determining a written value of the write variable at the merge node based on the propagated value, using a merge function. The written variable may be an array base, and the detecting may further comprise recursively evaluating temporary variables of the array base and writing a result of the recursive evaluation to the written variable.

In this embodiment, the identifying a read variable may further comprise detecting at least one of an assignment statement, a function call statement, or a conditional statement involving the read variable, and determining whether or not the at least one detected assignment statement, return statement, or conditional statement reads from the read variable. The determining may comprise indicating a certainty that the at least one detected assignment statement, the detected return statement, or detected conditional statement will read from the read variable when the first rule is executed. The determining may further comprise propagating an intermediate value of the read variable from a branch of a control flow graph to a merge node on the control flow graph, using a copy function, and evaluating a read value of the target variable at the merge node based on the propagated value, using a merge function. The determining may further comprise determining whether or not the read variable is a written array base, and storing the read variable if the read variable is not a written array base.

In this embodiment, the identifying path conditions may further comprise symbolically executing an identified rule to determine path conditions leading to at least one of a variable write or a variable read, and storing the determined path conditions. The symbolically executing may further comprise determining a symbolic value of a write variable using a backward recursive method. The symbolically executing may further comprise determining a symbolic value of a write variable by: propagating a first value from a first branch of a control flow graph to a merge node on the control flow graph using a copy function, the first value being associated with a first set of path conditions, propagating a second value from a second branch of a control flow graph to the merge node on the control flow graph using the copy function, the second value being associated with a second set of path conditions, and determining a write value of the write variable at the merge node based on the first and second set of path conditions and the first and second values.

The determining a write value of the write variable may further comprise one of: setting the write value equal to the first value if the second set of path conditions is empty and the first set of path conditions is not empty, setting the write value equal to the second value if the first set of path conditions is empty and the second set of path conditions is not empty, or setting the write value equal to the first or second value depending on a parameter, based on the symbolic execution. The identifying potential conflicts may further comprise identifying concurrent rules from the identified rules, the concurrent rules being rules that can be executed concurrently, and detecting conflicts within the concurrent rules. The detecting conflicts may further comprise identifying as possibly conflicting rules concurrent rules that can be executed by reading or writing a variable, and determining pairs of rules among the possibly conflicting rules for which: the variable is read by one of the pair and written by the other of the pair, or the variable is written by both rules of the pair.

This embodiment may further comprise executing test cases based on the potential conflicts to determine a likelihood that the potential conflicts will be encountered during operation of the rule-driven system. The executing test cases may further comprise: building a triggering graph including the identified rules, the triggering graph including rule nodes and variable nodes, connecting a first edge from a variable node to a rule node if a rule represented by the rule node is executed when a variable represented by the variable node is read or written, connecting a second edge from a rule node to a variable node if a rule writes to a variable represented by the variable node, connecting a third edge from a rule node to a variable node if a rule reads from a variable represented by the variable node, and executing test cases based on the triggering graph.

In another embodiment, a system may be provided for testing a rule-driven system. The system comprises: a memory device containing stored instructions, and at least one electronic processor coupled to the memory device and executing instructions to: detect at least one of a potential read-write error or a potential write-write error in a rule-driven system, generate test results based on the detecting, and report the test results.

In another exemplary embodiment, another system may be provided for testing a rule-driven system. The system comprises a memory device containing stored instructions, and at least one electronic processor coupled to the memory device. The processor executes the instructions to identify, by the processor, rules in the rule-driven system; construct a representation of the rule-driven system including the identified rules; identify, using the representation, variable reads and variable writes in the identified rules; and identify, using the representation, path conditions for the identified rules that lead to the variable reads and writes. The processor also executes instructions to identify, using the path conditions, potential conflicts among the identified rules and execute test cases based on the potential conflicts to determine a likelihood that the potential conflicts may be encountered during operation of the rule-driven system

BRIEF DESCRIPTION OF THE DRAWINGS

FIG. 6 shows structure of an exemplary rule of an RDA;

FIG. 7 shows an example of source code of an "ANother Tool for Language Recognition" (ANTLR) routine that extracts and stores information from a rule header;

FIG. 8 shows an exemplary mapping of a rule to a method of the JAVA® programming language;

FIG. 10 shows code for implementing a symbol table to map a rule to a JAVA programming language method;

FIG. 11 shows an example implementation in which a first operand of the "NOT_EQUAL" operator may be checked to determine whether or not it is primitive;

FIG. 12 shows exemplary code for handling relational operators in rules;

FIGS. 14-16 show methods used in embodiments consistent with the present disclosure to propagate information through a control flow graph (CFG);

FIGS. 19 and 20 show source code for copy and merge functions used in data flow analysis in embodiments consistent with the present disclosure;

FIG. 21 shows code generated for the assignment "array[i][j]=2";

FIG. 22 shows source code for a recursive method developed to deal with the problem of propagating assignment statements using array bases in embodiments consistent with the present disclosure;

FIG. 23 shows an example of code including a temporary read variable;

FIG. 24 shows a method implemented in embodiments consistent with the present disclosure to distinguish temporary read variables;

FIG. 26 shows an exemplary code fragment that propagates a conditional expression through two branches of a CFG;

FIG. 27 shows source code of getNegation(String symbol);

FIG. 28 shows pseudo-code for getSymbolicValue(u, op2);

FIG. 29 shows source code for a modified merge method used in path condition analysis in embodiments consistent with the present disclosure;

FIG. 32 shows a data structure for storing rules;

FIG. 33 shows a class PossibleConflict used to store possibly conflicting rules;

FIG. 34 shows methods used to read and write conflicts;

FIG. 35 shows a data structure used to store identified conflicts;

FIG. 36 shows an example Extensible Markup Language (XML) output of IdentifyConflicts( );

FIG. 37 shows source code for a class called ConditionalEdge;

FIG. 38 shows source code for a class called TriggeringGraph class;

DETAILED DESCRIPTION

Embodiments consistent with the present disclosure test for conflicts in RDAs. Other embodiments consistent with the present disclosure combine data-flow analysis with symbolic execution to detect situations where conflicts due to non-deterministic behavior in RDAs may lead to different results.

Overview of Strategy

In embodiments disclosed herein, data-flow analysis and symbolic execution may be combined to detect conflicts, as discussed in more detail below. Symbolic execution may yield conditions leading to potential conflicting access to variables in an RDA, for example. Conflicts may arise when such conditions are satisfied. Detecting potential conflicts and analyzing their conditions may help eliminate "false positives" (e.g., conflicts that may be identifies by analyses, such as data flow analyses, but that may be unlikely or impossible to occur because the conditions giving rise to them are unlikely or impossible to occur). Analyzing conditions for detected conflicts may also assist developers in understanding the contexts and circumstances that lead to their occurrence.

Figure 1:
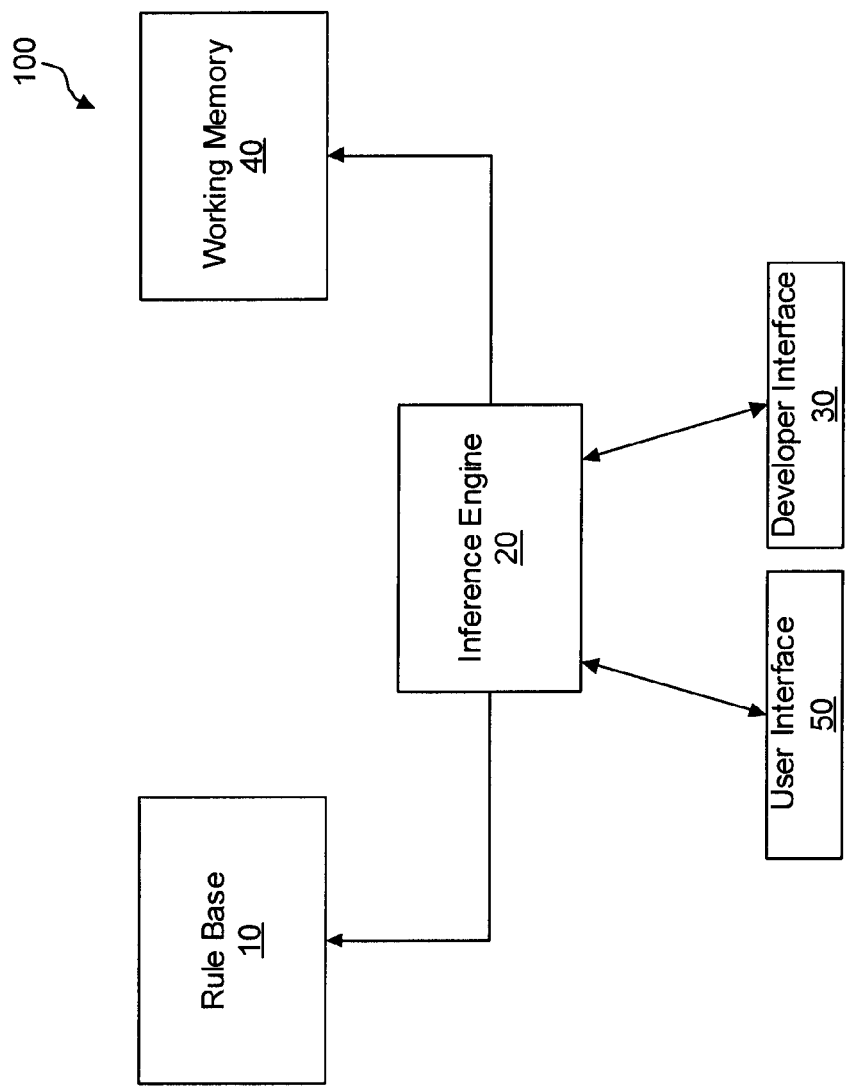
FIG. 1 shows an overview of organization in an exemplary RDA.
Figure 2:
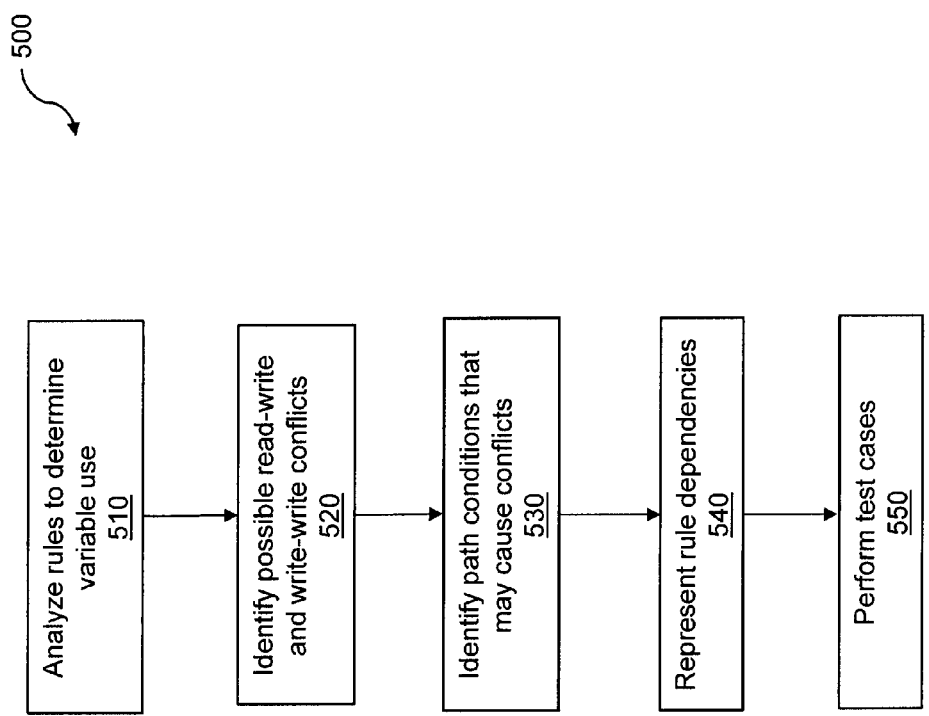
FIG. 2 shows a general overview of stages in a strategy of identifying conflicts in rule-based systems according to embodiments consistent with the present disclosure.

More specifically, FIG. 2 shows a general overview of stages in a strategy 500 of identifying read-write conflicts and write-write conflicts in rule-based systems according to embodiments consistent with the present disclosure. A "read-write error" or a "write-write" error is said to arise when a read-write conflict or a write-write conflict, respectively, leads to inconsistent or otherwise undesirable results in an RDA. As shown in FIG. 2, at step 510, rules in an RDA may be analyzed to determine use of variables or properties. At step 520, possible read-write and write-write conflicts in the rules may be identified. At step 530, path conditions may be identified where the identified path conditions are conditions under which the read-write or write-write errors are made. The path conditions may include, for example, conditions that specify how to reach statements and expressions where the read-write or write-write errors are located. At step 540, a representation of rule dependencies may be constructed which identifies rule execution sequences that may lead to the conflicts. At step 550, the representation may be used to test cases and, thereby, identify actual conflicts. The representation may be, for example, implemented in a testing procedure to identify actual conflicts. In addition, or alternatively, the representation may be presented to developers to facilitate error analysis (e.g., "bug fixing" or conflict elimination) and to help the developers better understand interactions of different rules and, thereby, the system of rules as a whole.

Overview of Exemplary Architecture and Workflow 700

Figure 3:
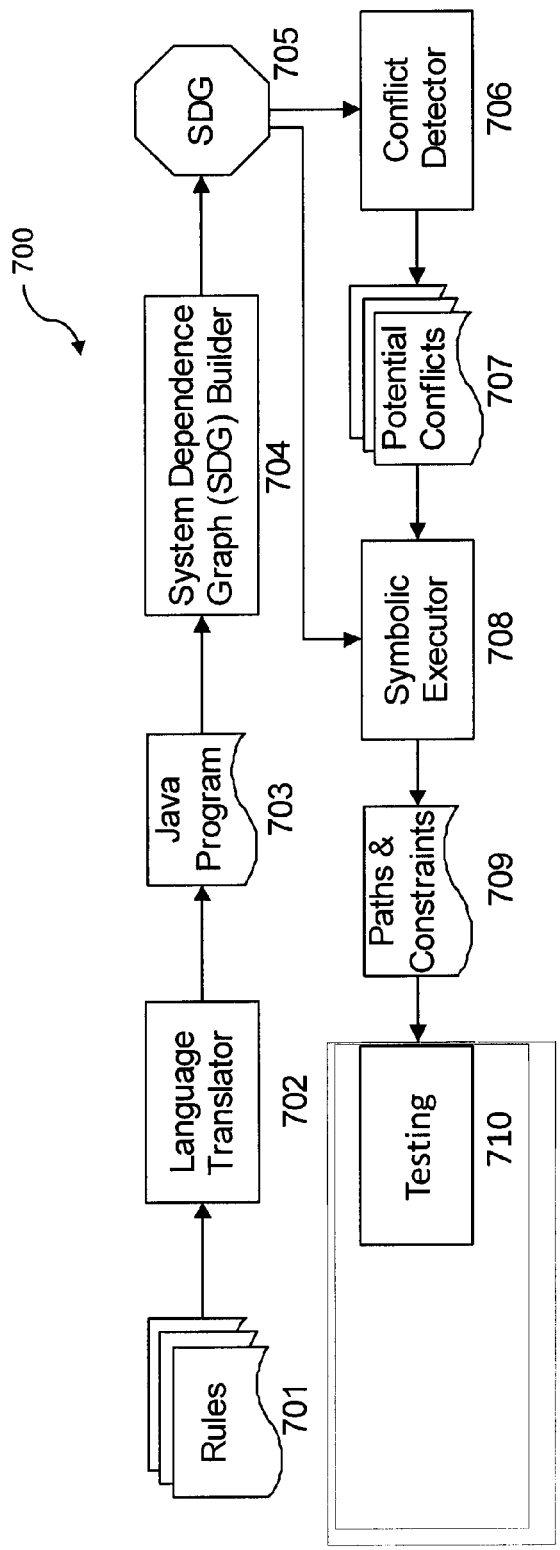
FIG. 3 shows an exemplary architecture and workflow of a system consistent with the present disclosure.

FIG. 3 shows an exemplary architecture and workflow 700 of a system for implementing the strategy 500 shown in FIG. 2, consistent with embodiments of the present disclosure. Solid arrows in FIG. 3 show command and data flows between components. The input to 700 is the set of rules 701 of the RDA. Individual rules in the set of rules 701 may be translated by a language translator 702. The language translator 702 may translate the rule into any suitable language.

For example, in an embodiment, the rules 701 may be translated into a JAVA programming language program 703. Next, a system dependence graph (SDG) builder 704 may use the program 703 to build an SDG 705 of the RDA. The SDG 705 represents all or a subset of rules in the RDA and is described in more detail below. The SDG 705 may be supplied to conflict detector 706. Conflict detector 706 may perform data flow analysis, for example, to determine potential conflicts in the RDA by identifying variable reads and variable writes. Conflict detector 706 may generate a list of potential conflicts 707 based on its analysis. This list 707 may be supplied to a symbolic executor 708 along with the SDG 705. Symbolic executor 708 may perform a control flow analysis and output a list of paths and constraints 709 for the paths that lead to potential conflicts, determined by its analysis. This list 709 may be supplied to another component or to an operator or user for testing 710 to verify the conflicts.

Overview of Example Embodiments

Figure 4:
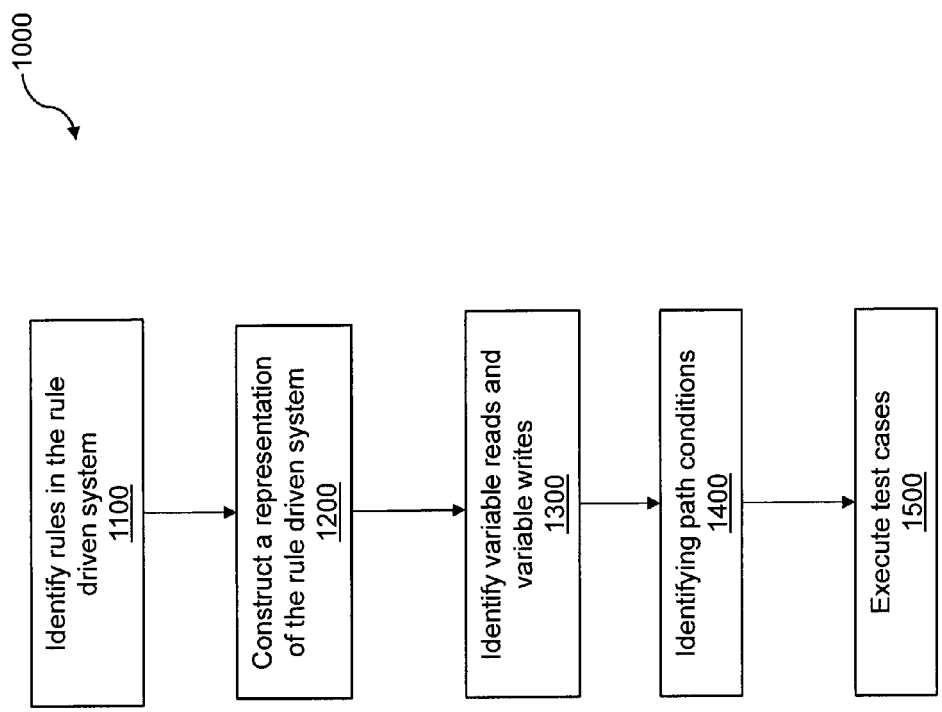
FIG. 4 shows a general overview of a process, consistent with the present disclosure, that implements the strategy of FIG. 2.

FIG. 4 shows a general overview of a method 1000, consistent with the present disclosure that implements the strategy of FIG. 2. At step 1100, rules in the RDA may be identified. At step 1200, a representation of the RDA may be constructed. At step 1300, variable reads and writes may be identified. At step 1400, path conditions leading to the variable reads and writes may be identified. At step 1500, test cases may be executed. The steps of method 1000 may be, for example, executed by a system having the architecture and workflow 700 shown in FIG. 3. It is to be understood, however, that implementation of the steps described in FIG. 4 and as explained in detail below is not limited to the architecture and workflow 700 shown in FIG. 3. Rather, implementation of the steps described in FIG. 4 and as explained in detail below may be accomplished on any suitable system with any suitable workflow.

Constructing a Representation of an RDA 1200

Figure 5:
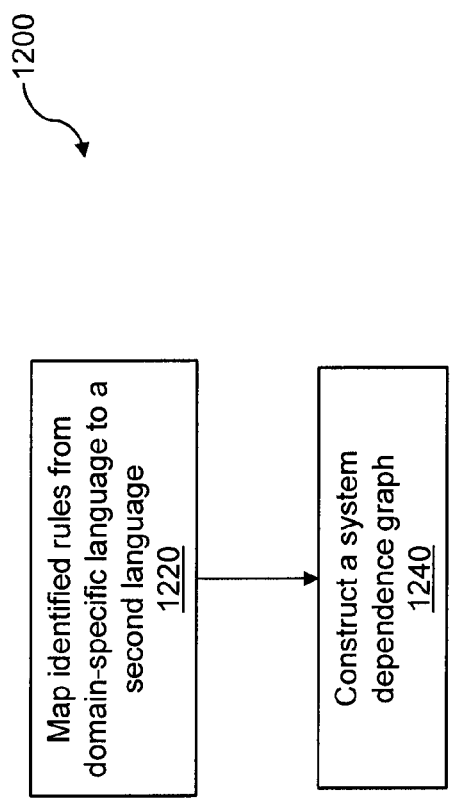
FIG. 5 shows a process of constructing a representation.

As shown in FIG. 5, an exemplary step of constructing a representation of an RDA includes step 1220, mapping rules from the RDA to a second language. Step 1220 may, for example, be performed by the language translator 702 shown in FIG. 3. Generally, step 1220 may be used because data and control flow analysis tools may not be equally available in all languages. More particularly, data and control flow analysis tools may be less likely to be available in domain-specific languages (e.g., high-level programming languages for rules that are associated with an RDA, a suite of RDAs or, for example, a real-world application) in which RDA rules are commonly written than they may be in languages with wider application, such as the JAVA programming language. However, it is to be understood that step 1220 is not meant to be restricted to any particular second language and, in fact, rules may be mapped in to any suitable second language for analysis. Other suitable second languages besides the JAVA programming language include the C++™ programming language, the C™ programming language, the Pascal™ programming language, the VisuaBasic™ programming language, or any other suitable programming language for testing and development of code. As described in more detail below, step 1220 may also include generating a representation of the RDA, such as generating an SDG 705 via an SDG builder 704 (FIG. 3). The platform or tools for generating a representation of the RDA may be performed irrespective of the particular second language chosen for the translation.

Domain-specific languages in which RDA rules may be written may be generally high-level languages customized for specific tasks. Rules in different RDAs or RBESs may be written in a plurality of different languages. Nevertheless, common features of rules in various languages can be generalized and exploited in developing rule-testing algorithms not limited to a particular rule language. In particular, common features of rules can be exploited in the translation of rules into the second language.

During mapping 1220, various rule components may be extracted using any suitable method or tool. One exemplary tool used in embodiments consistent with the present disclosure may be "ANother Tool for Language Recognition" (ANTLR). ANTLR is a language used to construct recognizers, interpreters, compilers, and translators for performing a plurality of actions on rules written in various languages. An ANTLR-based rule parser may, for example, extract information from a rule and translate the extracted information into a programming language, such as the JAVA programming language. The translated information may then be used to characterize the rule, such as by identifying variable reads and writes 1300 or path conditions 1400, as described subsequently.

As shown in FIG. 6, a rule 200 of an RDA may be divided into two components: a rule header 210 and a rule body 220. Information from both the rule header 210 and the rule body 220 may be extracted during mapping 1220, and both may be relevant to the determination of conflicts. A rule header 210 can specify identifying features of the rule, including its name, relationships with other rules, inputs, outputs, and other information. A rule body 220 may include rule source code. Source code in the rule body 220 is executed when the rule is executed and may contain a variety of programming language statements.

As shown in FIG. 6, the rule header 210 may include a plurality of fields. Any of the rule header 210 fields may be stored in mapping 1220. For example, "KIND" is a field defining a rule type which influences how execution of the rule may be triggered by other rules. A rule with "KIND" equal to "A_POST_SET_KIND" may be executed once a variable associated with the rule is written. In certain instances, the variable associated with the rule may be written to by another rule.

"PARENT ID" and "NAME" are fields used to define variables which may be used in conjunction with the field "KIND" to determine information such as when the rule may be executed.

"ARG PATH" and "PROPERTY" are fields that may be used to define properties or variables that rules may use when executed and the paths of those properties or variables in the RDA.

"RULE SPEC ID," "RULE LONG NAME," and "SYSTEM NAME" are fields that may be used to identify rules in embodiments consistent with the present disclosure and to ensure that each rule is translated to a unique JAVA programming language method.

In embodiments consistent with the present disclosure, parsing rules to extract information may include two operations: (1) saving the information contained in the rule header 210 into a data structure, and (2) translating the rule body 220 into a JAVA programming language method for use in the data flow analysis. In embodiments consistent with the present disclosure, an XML-based data structure may be used to store rule header 210 information. However, it is to be understood that any suitable data structure may be used. For example, a database may alternatively be used to store rule header 210 information. In certain embodiments consistent with the present disclosure, a combination of data storage methods and techniques may be used to store rule header 210 information (e.g., XML-based data structures may be used in combination with one or more databases). Using XML data structures may be used in certain instances because such data structures tend to be relatively easy to store or save. Databases, on the other hand, may provide efficiency of access and relative speed of managing data queries.

In method 1000, the XML data structure may be implemented using ANTLR to parse fields in the rule header 210, and save information contained in the parsed fields as a String variable called "xmlString." xmlString contains XML expressions as well as the fields of stored rule header 210. In method 1000, xmlString may be stored in a file. It is to be understood, however, that any suitable method of storing xmlString (e.g., storing xmlString to a database) may be within the context of the present disclosure. FIG. 7 shows an example of data of rule header 210 stored in xmlString.

Additional fields may be added to the XML data structure in embodiments consistent with the present disclosure. The added fields may include the length of the rule source code and the name of the JAVA programming language method which represents the translated rule, the latter being stored in a field called "methodName." methodName may be used to identify a rule. methodName may also be used to identify a JAVA programming language method corresponding to a rule. In method 1000, methodName may be obtained by concatenating the following fields from the rule header 210: "RULE SPEC ID," "SYSTEM NAME," "PARENT NAME," and various "ARG PATH" fields (see FIG. 6). However, it is to be understood that in embodiments consistent with the present disclosure, any suitable identifier can be used to identify a rule, its corresponding JAVA programming language method, or both.

FIG. 8 shows an example of source code of an ANTLR routine (e.g., a "grammar rule") that extracts and stores information from a rule header 210 in embodiments consistent with the present disclosure. As shown in FIG. 8, a field of rule header 210 called systemName may be processed and saved to xmlString. Further, FIG. 8 illustrates that xmlString may contain XML code, while rule::methodName may contain the methodName field from the rule header 210 in an XML data structure. The "SYSTEM NAME" field may be added after the elimination of characters that are not allowed in names of JAVA programming language methods.

As shown in FIG. 6, the rule body 220 may include a plurality of fields representing source code of the rule in rule language. In the exemplary rule shown in FIG. 6, source code of the rule body 220 is written in a BASIC-like language to, for example, define what the rule does upon execution and when the rule may be executed by the engine of the RDA. In embodiments consistent with the present disclosure, this source code of the rule body 220 may be translated into a JAVA programming language method.

At the beginning of a rule body, such as the rule body 220 (FIG. 6), there may be three declarations. "Receives" is a declaration that may be used to define the parameters provided as inputs from the rule engine. "Returns" is a declaration that, if present, may be used to define the return variable returned by the rule upon execution. Note that the "Returns" declaration need not be present and is not present in the exemplary rule body 220 of FIG. 6. "Uses" is a declaration that may be used to define local variables used inside the rule body 220 and the types of local variables.

Figure 9:
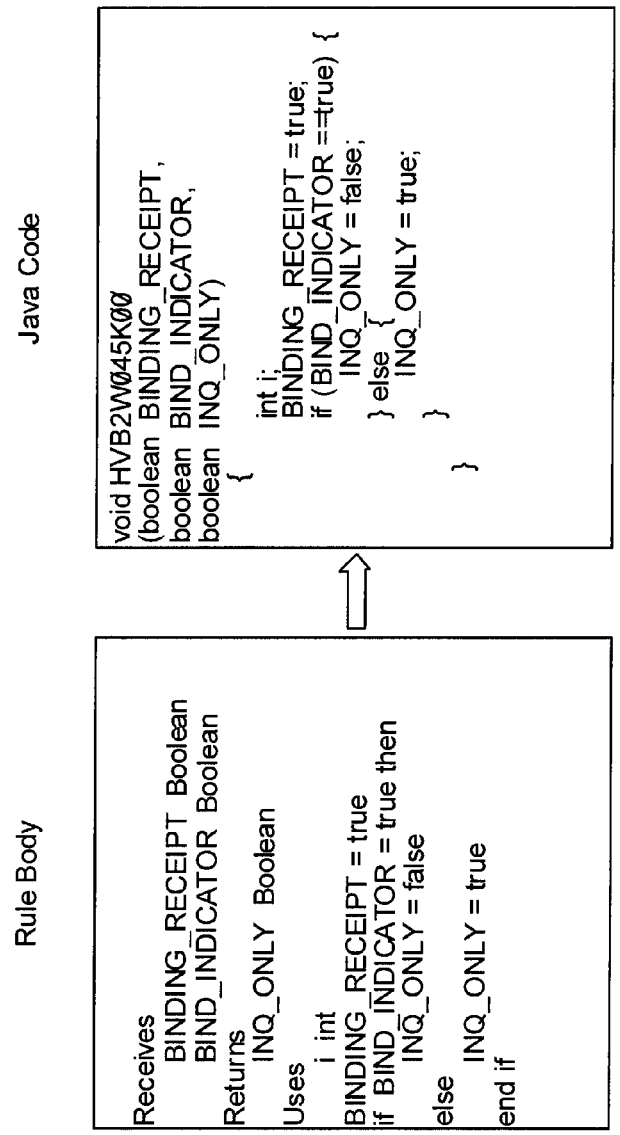
FIG. 9 shows an exemplary mapping of a rule to a JAVA programming language method.

In embodiments consistent with the present disclosure, the Receives, Returns, and Uses declarations may correspond, respectively, to declarations of a JAVA programming language method shown in FIG. 9. Several examples of "Parameter" declarations, or declarations of parameters that are written to by the method, are shown in FIG. 9 (e.g., "BINDING_RECEIPT" and "BIND_INDICATOR"). "Return variable" declarations are declarations that define a value returned by the method, as shown in FIG. 9 (e.g., declaration of "INQ_ONLY"). "Local variable" declarations are declarations that define local variables used within the rule, as shown in FIG. 9 (e.g., declaration of "int").

The following example illustrates a mapping technique that may be employed by embodiments consistent with the present disclosure. A rule may contain a "Rule Body" including two variables v0, v1 in its "Receives" declaration, a variable "r" in its "Returns" declaration, and two variables l0, l1 in its "Uses" declaration. The rule may be, for example, mapped to a corresponding JAVA programming language method having parameters v0, v1, and return type r, and declarations of local variables l0, l1.

The rule body 220 may further include source code translated into the method body. Typical source code statements found in a rule body 220 may include assignment statements, conditional statements, loop statements, switch statements, function call statements, and return statements. Each of these exemplary statements has a one-to-one correspondence with a JAVA programming language method statement. Therefore, each of these exemplary statements may be directly translated into the corresponding JAVA programming language method code.

Table 1 shows how variable types may be translated from rule language source code into a JAVA programming language method, in embodiments consistent with the present disclosure. As shown in Table 1, the "Rule language" types may be common to many programming languages.

TABLE 1

Type Translation

| Rule language | Java |
| --- | --- |
| Boolean | boolean |
| Currency | float |
| Float | float |
| Date | java.util.Date |
| Integer | int |
| String | String |
| Percentage | java.lang.Float |

In embodiments consistent with the present disclosure, an attribute type for expressions in a rule may be implemented via a symbol table. Type translation is important in order to generate the correct JAVA programming language code since the JAVA programming language syntax often differs from the rule language syntax. The symbol table may be a data structure used by language translators, such as language translator 702, to keep track of variables accessed by a rule and may include, for example, information relating to declarations of the variables.

Code for implementing a symbol table is shown in FIG. 10. Another symbol table may be used in embodiments consistent with the present disclosure for functions or code sequences in addition to variables. The function list appears in Table 2.

TABLE 2

Function List

| Function Name | Return type |
| --- | --- |
| dateAdd | DATE |
| date | DATE |
| dateDiff | INTEGER |
| dateSerial | DATE |
| dateValue | DATE |

TABLE 2-continued

Function List

| Function Name | Return type |
| --- | --- |
| day | INTEGER |
| month | INTEGER |
| year | INTEGER |
| getDate | DATE |
| getTimestamp | STRING |
| left | STRING |
| mid | STRING |
| right | STRING |
| trim | STRING |
| addTime | STRING |
| trimLeft | STRING |
| trimRight | STRING |
| replace | STRING |
| ubound | INTEGER |
| nextDimensionElementCount | INTEGER |
| elementCount | INTEGER |
| round | FLOAT |
| isNull | BOOLEAN |
| initializeValue | NULL |
| error | INTEGER |
| message | INTEGER |
| attachError | INTEGER |
| attachMessage | INTEGER |
| getGlobal | STRING |
| getGlobalInt | INTEGER |
| getGlobalFloat | FLOAT |

Translating rule source code including relational expressions including relational operators into the JAVA programming language may be potentially problematic for a number of reasons. For example, many rule languages allow the use of relational expressions (e.g., >, >=, <, <=, =, < >) with a relative larger number of data types, while the JAVA programming language allows the use of such operators only with primitive data types. Embodiments consistent with the present disclosure may deal with this problem by checking types of the operands of the expression of a relational expression in rule source code during translation. If one of the operators has a type other than primitive (e.g., if the operand has type String, Date, or Percentage), the relational expression may be translated using the JAVA programming language function java.lang.compareTo(Object o).

FIG. 11 shows an example implementation in which a first operand of the "NOT_EQUAL" operator may be checked to determine whether or not it is primitive. If the first operand is not primitive, another check may be performed to determine whether or not a second operand has a type that is compatible with a type of the first operand. Subsequently, a relational operation compatible with the operand types may be added in order to conclude the expression in the translation, as shown in the code of FIG. 12. In embodiments consistent with the present disclosure, these steps may be performed using, for example, java.lang.String, java.lang.Float, or java.util.Date. Finally, a JAVA programming language method resulting from the rule translation may be saved as a string and returned when parsing of the rule is concluded. In embodiments consistent with the present disclosure, translation of rules may return a String attribute called "javaString" including code for a corresponding JAVA programming language method.

Once the translation is performed, an SDG 705 (FIG. 3) representing the RDA may be constructed. An SDG 705 may be, for example, a graph in which nodes may be statements, expressions, or data dependence edges representing flow of data between nodes. Control dependence edges in an SDG 705 represent conditions on which execution of nodes depend. The SDG 705 may be supplied to components of system 700 shown in FIG. 3, or any other component discussed herein, to provide a representation of the rules 701 in the RDA. The SDG 705 may, for example, include every rule 701 in an RDA. Alternatively, the SDG 705 may include only a subset of rules in an RDA for testing and analysis. The SDG 705 may be generated by a variety of suitable SDG builders 704 in embodiments consistent with the present disclosure.

Identifying Variable Reads and Variable Writes 1300

Figure 13:
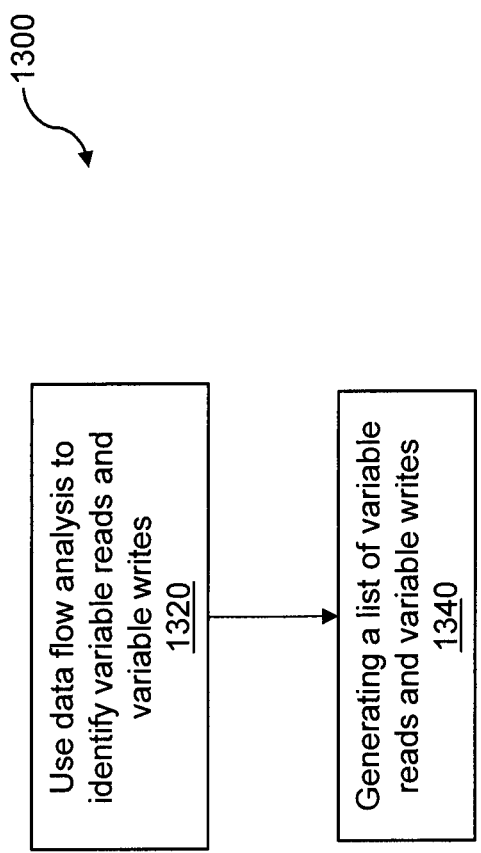
FIG. 13 shows a process of identifying variable reads and variable writes.

As shown in FIG. 13, the step of identifying variable reads and variable writes 1300 may include data flow analysis 1320 and generating a list of variable reads and variable writes 1340 from the data flow analysis 1320. In embodiments consistent with the present disclosure, data flow analysis 1320 may be performed using a plurality of tools available in the JAVA programming language programming, including "Soot," a framework for optimizing JAVA bytecode realized by the Sable research group from McGill University. More particularly, data flow analysis 1320 may be performed on the SDG 705 representing the RDA, as discussed in the previous section. It is to be understood, however, that data flow analysis 1320 in the present disclosure is not limited to using Soot, the JAVA programming language programming tools, or an SDG 705. In fact, any suitable platform for performing data flow analysis 1320 using any suitable programming language, such as the languages discussed above, may be used. A graphical representation, such as in an SDG 705, may be useful, but it is not a requirement to perform any of the steps described in FIG. 13 or elsewhere herein.

Soot Framework Relevant to Data Flow Analysis and Control Flow Analysis

Soot provides an intermediate representation called "Jimple" which may be used for analyzing JAVA programming language code to, for example, improve performance. In embodiments consistent with the present disclosure, Soot and Jimple may be used to perform inter-rule data flow analysis 1320.

Soot uses a control flow graph (CFG) structure implemented through the interface soot.toolkits.graph.DirectedGraph (A. Arni Einarsson and J. D. Nielsen, *A survivor's guide to the JAVA programming language program analysis with Soot*. Technical report, University of Aarhus, 2008). The CFG may be related or based on the SDG 705 discussed above. Alternatively, the CFG may be generated directly from the rules of the RDA, for example, without using the SDG 705. It is to be understood that the CFG may be generated using any suitable method in order to perform the identifying path conditions 1400 via control flow analysis.

CFGs include a plurality of different elements. Some of the elements relevant to embodiments consistent with the present disclosure are "branches" (e.g., branches of rule code whose execution depends on features such as conditional statements), "start nodes" (e.g., nodes at the beginning of a branch of code in a rule), "end nodes" (e.g., nodes at the end of a branch of node in a rule), and "merge nodes" (e.g., nodes where two branches may merge).

Embodiments consistent with the present disclosure may perform a data flow analysis 1320 using Soot including the following steps.

Step (1) Choose between "ForwardFlowAnalysis" and "BackwardFlowAnalysis." In "ForwardFlowAnalysis," data flow is evaluated from a start node and follows the CFG in a forward manner until it reaches a final value at an exit node. In "BackwardFlowAnalysis," data flow is evaluated in the reverse sense, e.g., from an exit node and following the CFG in a backward manner until it reaches a value at a start node.

Step (2) Determine a method of merging branch information at a "merge node" based on whether the analysis identifies a "Read"/"Write" or a "May Read"/"May Write." A "Read"/"Write" is a variable read or write certain to be executed when the rule is executed, while a "May Read"/"May Write" is a variable read or write that may or may not execute when the rule executes. Step (2) may also include deciding how to join "sets" of variable values in different branches at merge nodes and how to propagate information between consecutive elements in the CFG. Soot provides two methods for this purpose, called "merge" and "copy," respectively. In embodiments consistent with the present disclosure, "merge" and "copy" may be customized, as shown in FIG. 14. Customizing "merge" and "copy" may allow flexibility in "joining" two sets as well as in describing the flow of data within the CFG.

Step (3) Define equations that represent the flow of data through the CFG. In this step, the flowThrough( ) function, shown in FIG. 15, may be implemented. The flowThrough( ) function deals with data flow within the nodes of the CFG. The object "in" of the flowThrough( ) function (FIG. 15), for example, represents data prior to encountering a node. The object "out" of the flowThrough( ) function represents data after encountering a node. The object "out" generally includes data contained in the object "in," as well as information generated by gen( ), excluding information removed or eliminated by the function kill( ).

Step (4) Determine the initial state of the entry node and inner nodes (e.g., nodes within a branch). Initialization may include setting "sets" of variables at the entry node and inner nodes equal to an empty set or to a universal set. However, initialization in embodiments consistent with the present disclosure may be customized according to specific needs and, for example, according to specific aspects of the RDA. Therefore, step (4) may include overriding or customizing the methods provided by Soot shown in FIG. 16.

Step (5) Save the results. Results may be saved in any suitable manner described herein, including to files, databases, etc.

Data Flow Analysis 1320

Figure 17:
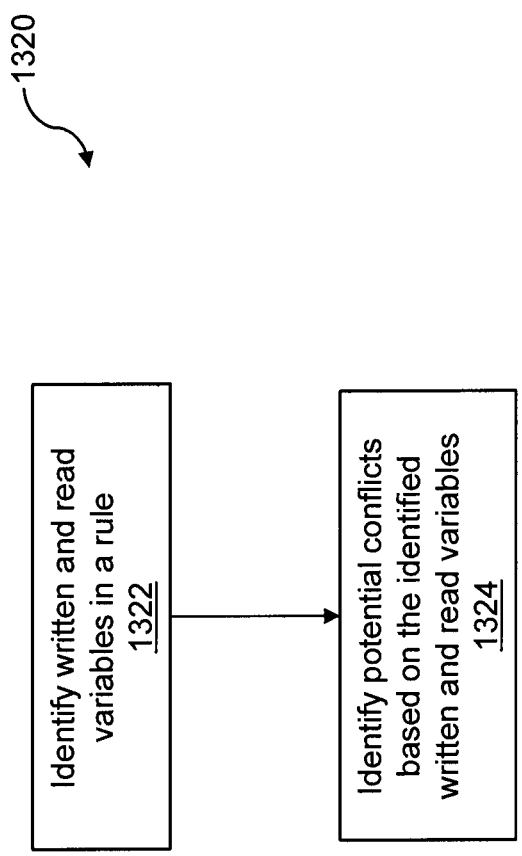
FIG. 17 shows a process of data flow analysis according to embodiments consistent with the present disclosure.

As shown in FIG. 17, a first step 1322 in data flow analysis 1320 may be to identify written and read variables in a rule. A second step 1324 may be to determine potential conflicts based on whether or not two rules write to and read from a common variable.

In embodiments consistent with the present disclosure, identifying written and read variables 1322 may proceed by identifying categories of interaction between rules and variables. The categories of interaction may be based, in part, on the potential of the rules and variables to result in conflict. In embodiments consistent with the present disclosure, four categories may be used. The categories may be defined as follows. A "Write" occurs if the execution of a portion of a rule that writes to a variable is certain. A "Read" occurs if the execution of a portion of a rule that reads from a variable is certain. "May Write" occurs if the execution of a portion of a rule that writes to a variable is possible, but not certain. "May Read" occurs if the execution of a portion of a rule that reads from a variable is possible, but not certain. In embodiments consistent with the present disclosure, these categories may be identified using a ForwardFlowAnalysis, as defined above.

Portions of the rules that write to variables may be identified by tracking two types of statements: rule assignment statements and rule return statements. Rule assignment statements indicate a potential write to a variable, and can be written in a form such as "A=B" (e.g., where variable A is written with the value contained in B). Rule return statements may also include a potential write to a variable. For example, a rule may include a return statement that returns a value C.

The existence of the return statement in a rule may indicate that the rule writes to variable C.

Portions of the rules that read from variables may be identified by tracking three types of statements in a rule: rule assignment statements, function call statements, and conditional statements. Rule assignment statements indicate a potential read from a variable, and can be written in a form such as A=B (e.g., where variable B is read in order to write its value to variable A). Function call statements also indicate a potential read from a variable. For example, a function call statement may appear as C.functionName(D). Both variables C and D may be read when the function call is executed. Conditional statements, such as "if" statements, also indicate a potential read from a variable. For example, a statement such as "if A=0 goto label1" indicates that variable A may be read if the statement is executed.

In embodiments consistent with the present disclosure, a data flow analysis 1320 propagates information along branches of rule code and performs intersection "sets" representing variable values at a point where the branches merge, i.e., a "merge point." The data flow analysis 1320 may be performed, for example, using a CFG. However, the data flow analysis 1320 does not require a CFG and may be performed with any suitable representation of rules in an RDA. This may allow the correct propagation of data in read or written variables.

Figure 18:
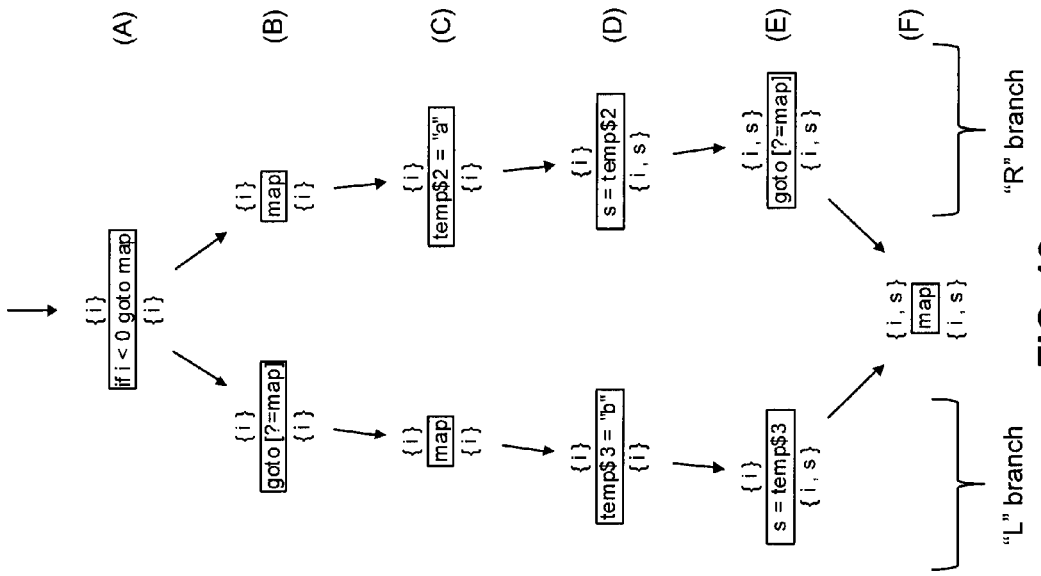
FIG. 18 shows an exemplary implantation of data flow or propagation along branches in a CFG according to embodiments consistent with the present disclosure.

FIG. 18, for example, shows an exemplary implantation of data flow, i.e., propagation, along branches in a CFG according to embodiments consistent with the present disclosure. As shown in FIG. 18, the variable "i" may be added to an "out-set" (a set of variables to be monitored during the analysis and denoted by brackets in FIG. 18) because of an assignment statement that occurs at position "A" in the CFG. The out-set, including variable "i," may then be propagated through the two branches L and R (left and right branches, respectively). Inside each of the branches L and R, variables may be added to the out-set when, for example, assignment statements that modify the variables are encountered. For example, in the L branch, the variable "s" has an assignment statement at position "E." Therefore, the variable "s" is added to the out-set in the L branch as position "E." In the R branch, on the other hand, the variable "s" has an assignment statement at position "D" and is correspondingly added to the out-set at position "D." At position "F," the data flow encounters a merge node. Therefore, at position "F," the out-sets for both L and R branches are merged. In the example shown in FIG. 18, merging of the out-sets are conducted using ForwardFlowAnalysis, as described above.

The data flow analysis 1320 may use both a copy function and a merge function provided by the Soot class Flowset. The copy function propagates the information to an out-set. The source code for the copy function appears in FIG. 19. Flowset.copy( ) copies data from the object "source" to the object "dest." The merge function may be used to join out-sets when two branches in the CFG merge to one merge node, as shown in FIG. 18. Source code for Flowset.copy( ) appears in FIG. 20.

Embodiments consistent with the present disclosure may include a recursive method developed to deal with the problem of propagating assignment statements using array bases. The problem is illustrated by the following example. Soot and Jimple often use temporary variables in the assignment of values to arrays. For example, the Jimple code generated for the assignment "array[i][j]=2" includes many such temporary variable assignment statements, as shown in FIG. 21. Use of temporary variables in array assignment can be indistinguishable, in data flow analysis 1320, from any other kind of assignment, such as an assignment indicating a write to a variable that may be relevant to a potential conflict.

In the case shown in FIG. 21, there are multiple assignments to "temp$0"-"temp$4," each of which has the potential to be identified by a data flow analysis looking for variable writes by checking for assignment statements. However, the temporary variable writes do not indicate writes that may, for example, affect the execution of other rules in an RDA. Therefore, the only variable in FIG. 21 that should be added to the out-set for data flow analysis (i.e., the only variable that may affect the execution of other rules and/or read/writes to variables) is the variable "array."

Source code for the recursive method that may be used to overcome the problem of "false positive" identification of assignment statements of temporary variables appears in FIG. 22. As shown in FIG. 22, the recursive method works by recursively resolving temporary variables used in array base assignment statements into real variable names in the JAVA programming language source.

Another problem may occur in data flow analysis 1320 when an ambiguous read situation is encountered, such as when a temporary read variable is read. In this case, the temporary read variable needs to be identified so it may be excluded from the out-set for data flow analysis for similar reasons as discussed above. The problem is illustrated by the example code segment shown in FIG. 23. When analyzing this code segment in forward order, "arraybase" would be included in the out-set because it appears in the assignment statement in the first line of code. However, it is, in fact, "temp$0" that is written, because it is used as an array base in the last statement, "temp$0[temp$1]=temp$2."

A possible way to eliminate such ambiguities is to check every possible read variable identified by its presence in an assignment statement to determine whether it is actually a written array base in a subsequent statement. If the possible read variable is not a written array base in a subsequent statement, it can be added to the out-set as a read variable. However, this method requires the computationally intensive task of examining all subsequent assignment statements for any given assignment statement. Instead, embodiments consistent with the present disclosure may use the method shown in FIG. 24 to identify written array bases in a way that may limit the complexity and execution time. The method shown in FIG. 24 stores all the written array bases in a data structure prior to data flow analysis 1320. During the data flow analysis 1320, the method in FIG. 24 checks whether the variable in each assignment statement of a rule is contained in the stored written array bases.

Identifying Path Conditions Leading to Variable Reads and Variable Writes 1400

Figure 25:
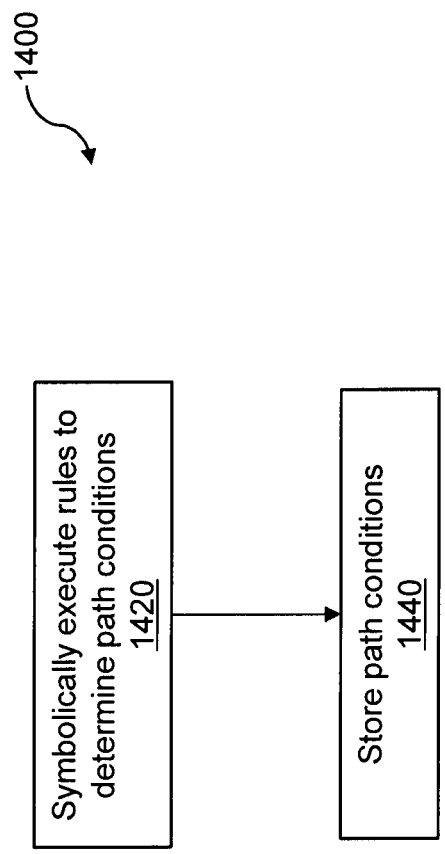
FIG. 25 shows a process of control flow analysis according to embodiments consistent with the present disclosure.

In embodiments consistent with the present disclosure, identifying path conditions 1400 via control flow analysis (FIG. 4) can be used for determining the likelihood that a "May Read" and "May Write," as defined above, actually occur when rules are executed in an RDA. Identifying path conditions 1400 via control flow analysis may also determine specific path conditions leading to conflicts caused by "May Read" and "May Write." As shown in FIG. 25, a first step 1420 in identifying path conditions 1400 via control flow analysis may be to symbolically execute rules to determine path conditions. Symbolic execution (also referred to as "symbolic evaluation") analyzes a rule, program, or routine by tracking symbolic values representing the value variables the code would take on during actual execution of the code. A second step 1440 in the identifying path conditions 1400 via control flow analysis may be to store the path conditions for determining potential conflicts. Identifying path conditions 1400 via control flow analysis may be performed on the SDG 705 or CFG representing the RDA, as discussed above. However, it is to be understood that identifying path conditions 1400 via control flow analysis in the present disclosure is not limited to using either Soot, JAVA programming language programming tools, or an SDG 705. In fact, any suitable platform for performing identifying path conditions 1400 via control flow analysis using any suitable programming language, such as the languages discussed above, may be used. A graphical representation, such an SDG 705 or a CFG, may be useful but is not a requirement to perform any of the steps described in FIG. 25 or elsewhere herein.

Symbolic Execution and Control Flow Analysis in the Context of the Present Disclosure Symbolic execution may allow the analysis of control flow (i.e., performing identifying path conditions 1400 via control flow analysis) of a program by evaluating data dependencies for a path in the program. The "state" of a symbolically executed program includes the values of symbolic variables in the symbolic execution. When a program is executed symbolically, its state may be changed by evaluating the program statements sequentially and monitoring the resultant effect on the symbolic variables.

The methodology in symbolic execution can be illustrated with the following example. Consider two consecutive statements in a program to be symbolically executed, "x=2y" and "y=y+x." Initially, in symbolic execution, variables x and y may be assigned symbolic values X and Y, respectively. After symbolically executing the first statement, x has the value 2Y. After executing the second statement, the value of y may be Y+2Y. When symbolically executing numerical programs, variables obtain symbolic values of polynomial expressions.

Symbolic execution trees (SETs) are graphs characterizing execution paths followed during the symbolic executions of a program. Nodes in SETs correspond to executed statements, and edges, or lines connecting nodes, correspond to transitions between statements in the program. Each node in the SET describes the current state of execution and includes symbolic values of variables in the program and a statement counter that increments with the execution of each statement. Nodes for branching statements (e.g., "if" or "while" statements) have two edges that connect to nodes with different condition predicates. Nodes with branching statements are often analyzed in control flow analysis and are further described below.

Identifying path conditions 1400 via control flow analysis in embodiments consistent with the present disclosure may be implemented by modifying Soot class soot.toolkits.scalar.ForwardBranchedFlowAnalysis (described in the context of data flow analysis 1320 above). soot.toolkits.scalar.ForwardBranchedFlowAnalysis allows the propagation of different information to the different branches of a CFG. The feature may be used to generate and store path conditions relating to conditional statements. For example, the following conditional statement:

if A>2 then B else C divides a CFG into two branches, a "then" branch and an "else" branch. The path conditions for the "then" branch can be stored as "A>2." The path conditions for the "else" branch can be stored as "A<=2." FIG. 26 shows an exemplary code fragment that propagates a conditional expression through two branches.

In embodiments consistent with the present disclosure, a conditional statement, such as an if statement, may be composed of two operands and an operator relating the operands. In order to determine the path conditions of the branches resulting from the conditional statement, symbolic execution of the statement may be performed. Symbolic execution may analyze the data flow through both branches created by the conditional statement. Therefore, in symbolic execution, one branch is analyzed by assuming the conditional statement is TRUE or satisfied. The other branch is analyzed by assuming the condition statement is FALSE or unsatisfied, e.g., by negating the operator in the conditional statement.

Embodiments consistent with the present disclosure may use a plurality of methods in symbolic execution to explore multiple branches in rule code by evaluating the fulfillment and the negation of a condition. Two exemplary Soot methods are getSymbolicValue(u, op2) and getNegation(String symbol), respectively. getNegation(String symbol) returns the negation of a relational operator that may be passed as "symbol," as may be seen in source code shown in FIG. 27.

getSymbolicValue(u, op2) (source code shown in FIG. 28) is somewhat more complicated. getSymbolicValue(u, op2) is recursive in that it receives, as an input, a variable "u" and the statement in which it may be used, "op2." It then implements a recursive function to find the symbolic value of the input variables from a previous instruction. The symbolic value may be calculated, for example, by recursively returning a previous assignment of a local variable and substituting the symbolic value assigned to it for the symbolic value.

A modified merge method may be used in embodiments consistent with the present disclosure for path condition analysis. Code for the modified merge method appears in FIG. 29. The modified merge method may propagate a value of one of "inSet1" and "inSet2," where inSet1 and inSet2 specify path conditions for two different branches. If one of inSet1 and inSet2 is empty, indicating no path conditions for the branch, the other may be propagated. If both inSet1 and inSet2 contain some path conditions, on the other hand, propagation depends on a constant called "PATHCONSTANT" that is passed as a parameter.

Figure 30:
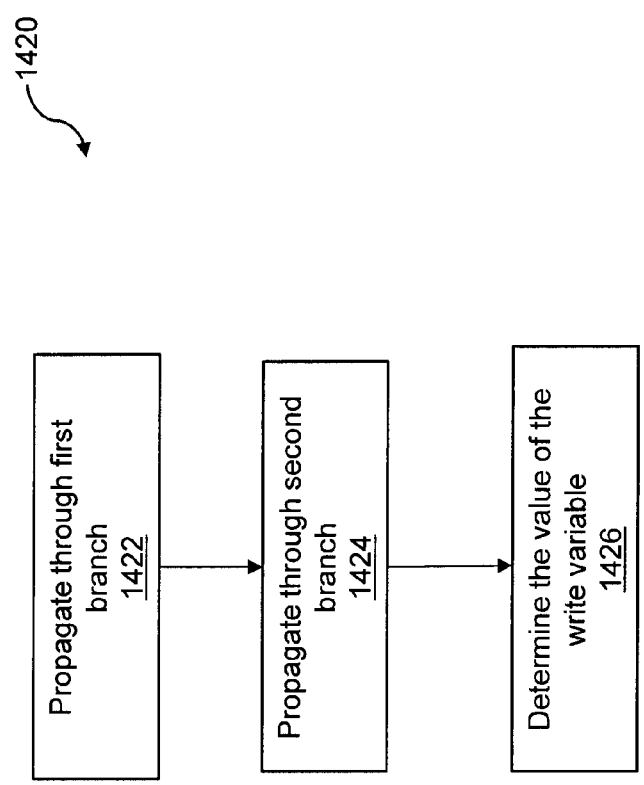
FIG. 30 shows a of process of control flow analysis through two branches in a graph with respect to a write variable.

FIG. 30 gives an overview of symbolic execution 1420 through two branches in a graph with respect to a write variable. As shown in FIG. 30, the identifying path conditions via control flow analysis propagates variable values through the first and second branches 1422, 1424. At the merge node 1426, a final value of the write variable may be determined according to a merge function.

Figure 31:
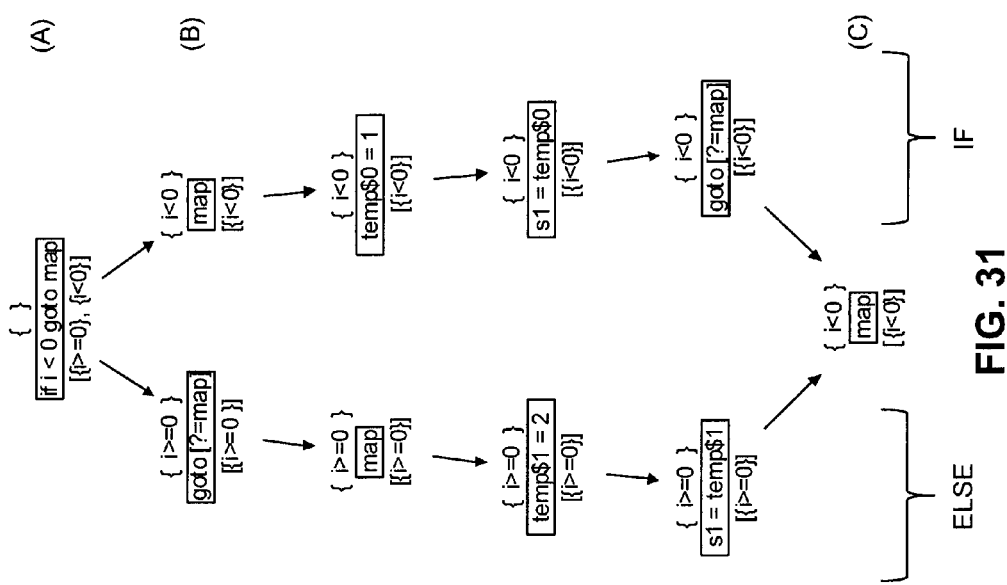
FIG. 31 illustrates control flow in two different branches of code.

FIG. 31 illustrates control flow in two different branches of code, an "IF" branch and an "ELSE" branch. The IF and ELSE branches result from an IF statement at position A in the code, which generates two complimentary conditions (e.g., one condition if the IF statement may be true and the other when the IF statement may be false). One of the conditions, "i<0," may be propagated to the IF branch, as shown in step B. The complementary condition, "i>=0," may be propagated to the ELSE branch, as shown in step B. In this particular example, as shown in step C, the condition from the IF branch, "i<0," is propagated to the merge node.

The results from both data flow analysis 1320 and identifying path conditions via control flow analysis may be stored in a data structure represented by the class Rule, shown in FIG. 32. The main components of this data structure are: "ruleMethodName" (an identifier for the rule that includes the name of the JAVA programming language method representing the rule), "parent" (a variable that influences the execution of the rule), "kind" (a string that represents a rule kind dictating how the rule may be executed), and four properties that represent the written, read, mayWritten, and mayRead variables associated with the rule. The "Property" class, also shown in FIG. 32, represents a variable with the name "variableName" within the JAVA programming language. "full-PathName" is a name that identifies the variable within the RDA. Identifying path conditions 1400 via control flow analysis may fill "firstPathConditions" and "secondPathConditions" when the Property represents mayWritten or mayRead variables. The data structures represented by the Rule and Property classes may be exported as an XML file. An example of XML representation of a rule is provided in the next section.

Conflict Identification

In embodiments consistent with the present disclosure, the results of the data flow analysis 1320 and identifying path conditions 1400 via control flow analysis may be used to detect possible conflicts between rules. Identification of conflicts can be divided into two main steps: (1) identification of rules that can be triggered concurrently (i.e., "concurrent rules") and (2) detection of conflicts within the concurrent rules.

A conflict arises when two rules R1, R2 can be executed concurrently and at least one of the following situations occurs: (1) a variable "p" may be read by R1 and written by R2, (2) a variable "p" may be read by R2 and written by R1, and (3) a variable "p" may be written by both R1 and R2. In the cases in which reading or writing to variable p may be uncertain (e.g., "mayWritten" or "mayRead"), path conditions that lead it to the possible read or write may be analyzed.

Rules in an RDA may be assigned properties allowing identification of groups of rules that can be fired by reading or writing on a certain property (e.g., "parentProperty"). For example, rules having the ReadTriggeredKind property may be executed when their pmay bentProperty is read. Rules having WriteTriggeredKind may be executed when their parentProperty is written. Exemplary variables stored in either ReadTriggeredKind and WriteTriggeredKind are presented in Table 3.

TABLE 3

Read and Write Triggered Kinds

| Read triggered | Write triggered |
| --- | --- |
| IS_VALID_KIND | POST_SET_KIND |
| SUGGESTED_VALUE_KIND | POST_ADD_KIND |
| IS_REQUIRED_KIND | LOWER_LIMIT_KIND |
| LOWER_LIMIT_KIND | UPPER_LIMIT_KIND |
| UPPER_LIMIT_KIND | ALLOWED_VALUE_KIND |
| ALLOWED_VALUE_KIND | |

Possible conflicts may be detected simply by matching rules with ReadTriggeredKinds and WriteTriggeredKinds. For example, groups of rules with matching ReadTriggeredKind and WriteTriggeredKind may be added to the class PossibleConflict, shown in FIG. 33. PossibleConflict stores the pmay bentProperty along with the rules. Two methods, getRConflicts( ) and getWConflicts( ) of the class XMLQueryUtility may be used to return respectively the read and write triggered PossibleConflicts. getRConflicts( ) is shown in FIG. 34.

Next, actual conflicts within the rules stored in PossibleConflict may be evaluated. This step may be performed by the method IdentifyConflicts( ) of the class ConflictIdentificator. IdentifyConflicts( ) proceeds by finding rule pairs (R1, R2) in PossibleConflict in which at least one of: (1) a variable "p" is read by R1 and written by R2, (2) a variable "p" is read by R2 and written by R1, or (3) a variable "p" is written by both R1 and R2. A rule pair identified by IdentifyConflicts( ) represents a conflict. The identified conflict may then be stored in the structure shown in FIG. 35.

XML may be chosen to represent the data structure for its versatility and usability. An example XML output of IdentifyConflicts( ) appears in FIG. 36. The example conflict arises on the property NAMED.SEQUENCE_NUMBER that is written by the rule PPFM3049D00DLTE and is read by rule Y5XBF03Z700YR under the condition: (NAME_TYPE)==0, NAME_TYPE!="I." However, it should be understood that any suitable method of storing results may be used in connection with embodiments consistent with the present disclosure.

Reachability Analysis

The conflicts identified by IdentifyConflicts( ) are, in fact, potential conflicts. One way of determining a likelihood of whether or not the identified conflicts will occur during operation of the RDA is to perform a reachability analysis.

To implement a reachability analysis in embodiments consistent with the present disclosure, a reachability graph (e.g., FIG. 39) including rules in the RDA may be constructed. The reachability graph may use the SDG 705 or CDG of the RDA, for example. However, in embodiments consistent with the present disclosure, the reachability graph may be constructed without reference to another graphical representation of the RDA. The reachability graph may have two kinds of nodes: (1) rule nodes representing rules in the RDA, and (2) property nodes representing variables in the RDA. For each rule in the RDA identified by IdentifyConflicts( ) as leading to a potential conflict, at least two property nodes are created: a ReadPropertyNode and a WritePropertyNode. The ReadPropertyNode and the WritePropertyNode indicate, respectively, a read and a write on the property in the potential conflict.

The reachability graph may have at least two kinds of "edges." A first kind of edge links a property node to a rule node. This type of edge exists if the rule is triggered when the property is read or written. In the case in which the property is read, the property node is a ReadPropertyNode. In the case in which the property is written, the property is a WritePropertyNode.

A second kind of edge links a rule node to a property node. In the case in which the rule reads the property, the property node is a ReadPropertyNode. In the case in which the rule writes to the property, the property is a WritePropertyNode.

An edge linking a property node to a rule node may be implemented using a java.util.Map structure that associates a property with a set of rules (Map<PropertyNode, Set<RuleNode>>propertyToRulesEdges). An edge linking a property node to a rule node may be implemented by the class ConditionalEdge shown in FIG. 37.

The reachability graph implementation may be, for example, contained in the Triggering-Graph class which contains functions to add nodes and edges, retrieve nodes and edges from the reachability graph, and check for duplicate nodes or edges. The source code for this class is shown in FIG. 38.

To verify the reachability graph and provide visual representation of the conflict, embodiments consistent with the present disclosure draw the graph using GraphML, a comprehensive file format for graphs based on XML may be provided. A function of the Triggering-Graph class codes the graph into a GraphML stream which can be saved to a file. The file can be used by many different visualization tools, any of which should be considered within the scope of the present disclosure.

The following visual symbolic representations may be chosen for the reachability graph in embodiments consistent with the present disclosure. However, it is to be understood that any suitable symbolic representation may be used and the disclosure may be not limited to those discussed herein. Rules may be represented by round nodes and labeled with an identifier. Properties may be represented with square nodes and labeled by the path name of the property preceded by "Read" or "Write," depending on the action associated with the property.

Figure 39:
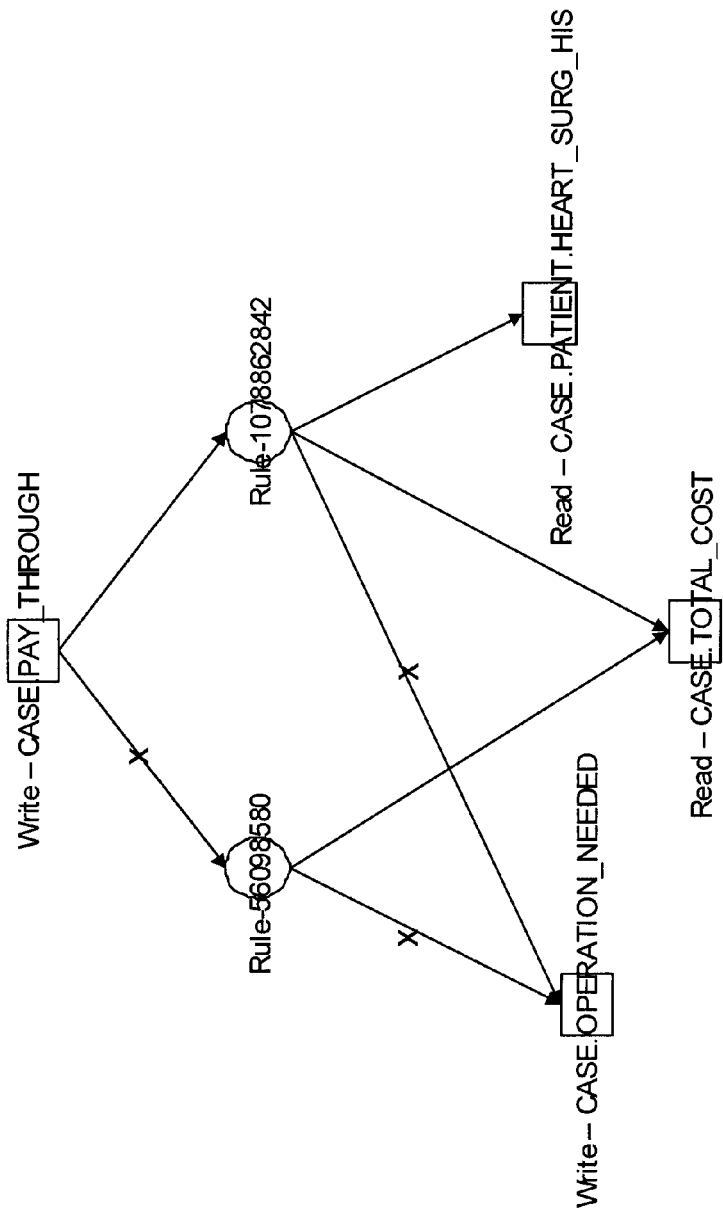
FIG. 39 illustrates a portion of a reachability graph generated in embodiments consistent with the present disclosure.

FIG. 39 illustrates a portion of a reachability graph generated in embodiments consistent with the present disclosure. Edges involved in a conflict are identified by an "X" marker midway along their length. In the example, the two rules Rule-56098580 and Rule-1078862842 are executed by a write on the "CASE.PAY_THROUGH" property. Because both Rule-56098580 and Rule-1078862842 are executed by a write to the same property, they can be fired concurrently. In addition, both Rule-56098580 and Rule-1078862842 perform a write operation on the property "CASE.OPERATION_NEEDED." Therefore, if two RDAs trigger Rule-56098580 and Rule-1078862842 in different sequences, this will result in different values of CASE.OPERATION_NEEDED.

Exemplary Implementation

Figure 40:
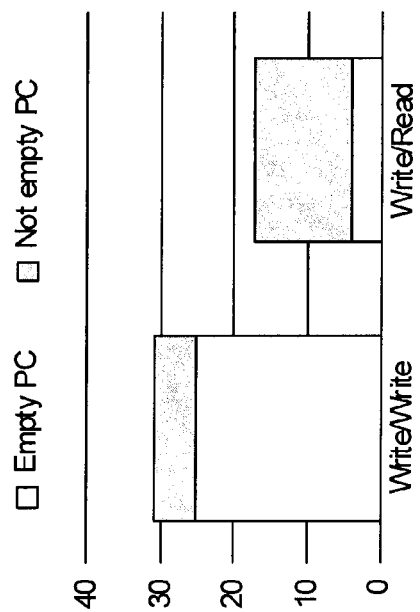
FIG. 40 shows results obtained from using a system consistent with the present disclosure to test an experimental medical RDA.

The disclosed system may be tested on a subset of rules in an experimental medical RDA. The results may identify several potential conflicts. The rule subset consisted of 1292 rules. FIG. 40 shows the possible results of the test, including the identification of 48 conflicts. As shown in FIG. 40, the majority of the identified conflicts may be write-write conflicts, i.e., conflicts that occur when more than one rule tries to write the same variable. FIG. 40 also shows the proportion of conflicts that are associated with a path condition (PC) as the shaded portion of the graph. The tested subset of the system constitutes about 10% of rules in the RDA. Applying the analysis to the entire rule base may be expected to increase the number of potential conflicts.

The specific order or hierarchy of steps in the processes disclosed are an illustration of exemplary approaches. Based upon design preferences, manufacturing equipment, and other considerations, the order or hierarchy of the steps may be rearranged. The accompanying method claim, therefore, does not limit the specific order or hierarchy to the order of the elements presented.

It may be apparent to those skilled in the art that various modifications and variations can be made to the disclosed methods and materials. It may be intended that the specification and examples be considered as exemplary only, with a true scope of the disclosure being indicated by the following claims and their equivalents.

We claim:

1. A non-transitory computer-readable medium tangibly embodied in a storage device encoded with instructions that, when executed on a processor, perform a method in a computer system, the method comprising:
   detecting for a potential read-write error and a potential write-write error in a rule-driven system;
   detecting a potential error in the rule-driven system, the potential error comprising at least one detected potential read-write error or at least one detected potential write-write error;
   constructing a representation of the rule-driven system, the representation including the potential error;
   generating test results by symbolically executing test cases based on the constructed representation, wherein the test cases comprise less than all rules of the rule-driven system;
   determining a likelihood that the detected potential error will be encountered during operation of the rule-driven system based on the symbolic execution; and
   reporting the test results.

2. The medium according to claim 1, wherein the constructed representation includes a system dependence graph.

3. The medium according to claim 1, wherein the detecting further comprises:
   mapping rues in the rule-driven system, written in a first language, to a second language.

4. The medium according to claim 3, wherein the first language is a domain-specific language and the second language is the JAVA programming language.

5. A non-transitory computer-readable medium tangibly embodied in a storage device encoded with instructions that, when executed on a processor, perform a method in a computer system, the method comprising:
   identifying, by the processor, rules in a rule-driven system;
   constructing a representation of the rule-driven system including the identified rules;
   identifying, using the constructed representation, variable reads and variable writes in the identified rules;
   identifying, using the constructed representation, path conditions for the identified rules that lead to the variable reads and writes;
   identifying, using the path conditions, potential conflicts among the identified rules, the identifying potential conflicts comprising detecting for a potential read-write error and a potential write-write error; and
   executing test cases based on the potential conflicts to determine a likelihood that the potential conflicts will be encountered during operation of the rule-driven system, wherein the test cases comprise less than all rules of the rule-driven system.

6. The medium according to claim 5, wherein the identifying potential conflicts further comprises identifying a potential conflict, the potential conflict including at potential read-write error or at least one detected potential write-write error.

7. The medium according to claim 5, wherein the constructing a representation further comprises:
   mapping the identified rules from a domain-specific language to a second language; and
   constructing a system dependence graph to represent the identified rules.

8. The medium according to claim 7, wherein the mapping further comprises:
   extracting header and body information from the identified rules;
   translating the header and body information into the second language; and
   storing the translated header and body information.

9. The medium according to claim 8, wherein:
   the second language is the JAVA programming language;
   the translating further comprises translating the body information into a method of the JAVA programming language; and
   the storing further comprises storing the header information into a data structure.

10. The medium according to claim 8, wherein:
   the second language is the JAVA programming language;
   the translating further comprises translating the body information into a method of the JAVA programming language by:
      assigning attribute types of the JAVA programming language corresponding to variables in the first language using a variable symbol table;
      assigning attribute types of the JAVA programming language corresponding to functions in the first language using a function symbol table; and
   the storing further comprises storing the method of the JAVA programming language as a string.

11. The medium according to claim 5 wherein the identifying variable reads and variable writes further comprises:
using data flow analysis to identify variable reads and variable writes; and
generating a list of the identified variable reads and variable writes.

12. The medium according to claim 11, wherein the using data flow analysis further comprises, for a first rule of the identified rules:
identifying at least one of:
a written variable and a portion of the first rule that writes to the written variable; or
a read variable and a portion of the first rule that reads the read variable; and
identifying a potential conflict when a second rule of the identified rules:
writes to the read variable; or
reads from the written variable.

13. The medium according to claim 12, wherein the identifying a written variable further comprises:
detecting at least one of:
an assignment statement in the first rule involving the written variable; or
a return statement in the first rule involving the written variable; and
determining whether or not the at least one detected assignment statement or detected return statement writes to the written variable, 14. The medium according to claim 13, wherein the determining comprises indicating a certainty that the at least one detected assignment statement or detected return statement will write to the written variable when the rule is executed.

15. The medium according to claim 13, wherein the determining further comprises:
propagating an intermediate value of the written variable from a branch of a control flow graph to a merge node on the control flow graph, using a copy function; and
determining a written value of the write variable at the merge node based on the propagated value, using a merge function.

16. The medium according to claim 13, wherein:
the written variable is an array base, and
the detecting further comprises recursively evaluating temporary variables of the array base and writing a result of the recursive evaluation to the written variable.

17. The medium according to claim 12, wherein the identifying a read variable further comprises:
detecting at least one of an assignment statement, a function call statement, or a conditional statement involving the read variable; and
determining whether or not the at least one detected assignment statement, return statement, or conditional statement reads from the read variable.

18. The medium according to claim 17, wherein the determining comprises indicating a certainty that the at least one detected assignment statement, the detected return statement, or detected conditional statement will read from the read variable when the first rule is executed.

19. The medium according to claim 17, wherein the determining further comprises:
propagating an intermediate value of the read variable from a branch of a control flow graph to a merge node on the control flow graph, using a copy function; and
evaluating a read value of the target variable at the merge node based on the propagated value, using a merge function.

20. The medium according to claim 17, wherein the determining further comprises:
determining whether or not the read variable is a written array base, and
storing the read variable if the read variable is not a written array base.

21. The medium according to claim 5, wherein the identifying path conditions further comprises:
symbolically executing an identified rule to determine path conditions leading to at least one of a variable write or a variable read; and
storing the determined path conditions.

22. The medium according to claim 21, wherein the symbolically executing further comprises determining a symbolic value of a write variable using a backward recursive method.

23. The medium according to claim 21, wherein the symbolically executing further comprises determining a symbolic value of a write variable by:
propagating a first value from a first branch of a control flow graph to a merge node on the control flow graph using a copy function, the first value being associated with a first set of path conditions;
propagating a second value from a second branch of a control flow graph to the merge node on the control flow graph using the copy function, the second value being associated with a second set of path conditions; and
determining a write value of the write variable at the merge node based on the first and second set of path conditions and the first and second values.

24. The medium according to claim 23, wherein determining a write value of the write variable further comprises one of:
setting the write value equal to the first value if the second set of path conditions is empty and the first set of path conditions is not empty;
setting the write value equal to the second value if the first set of path conditions is empty and the second set of path conditions is not empty; or
setting the write value equal to the first or second value depending on a parameter, based on the symbolic execution.

25. The medium according to claim 7, wherein the identifying potential conflicts further comprises:
identifying concurrent rules from the identified rules, the concurrent rules being rules that can be executed concurrently; and
detecting conflicts within the concurrent rules.

26. The medium according to claim 25, wherein the detecting conflicts further comprises:
identifying as possibly conflicting rules concurrent rules that can be executed by reading or writing a variable; and
determining pairs of rules among the possibly conflicting rules for which:
the variable is read by one of the pair and written by the other of the pair; or
the variable is written by both rules of the pair.

27. The medium according to claim 5, wherein the executing test cases further comprises:
building a triggering graph including the identified rules, the triggering graph including rule nodes and variable nodes;
connecting a first edge from a variable node to a rule node if a rule represented by the rule node is executed when a variable represented by the variable node is read or written;

connecting a second edge from a rule node to a variable node if a rule writes to a variable represented by the variable node;

connecting a third edge from a rule node to a variable node if a rule reads from a variable represented by the variable node; and executing test cases based on the triggering graph.

28. A system comprising:

a memory device containing stored instructions; and at least one electronic processor coupled to the memory device and executing instructions to identify rues in a rule-driven system;

construct a representation of the rule-driven system including the identified rules;

identify, using the constructed representation, variable reads and variable writes in the identified rules;

identify, using the constructed representation, path conditions for the identified rules that lead to the variable reads and writes;

identify, using the path conditions, potential conflicts among the identified rules, the identifying potential conflicts comprising detecting for a potential read-write error and a potential write-write error; and execute test cases based on the constructed representation, the path conditions, and the potential conflicts to determine a likelihood that the potential conflicts will be encountered during operation of the system, wherein the test cases comprise less than all rules of the rule-driven system.

29. The medium according to claim 1, wherein the at least one detected potential read-write error identifies when a variable is read by a first identified rule and written by a second identified rule.

30. The medium according to claim 1, wherein the at least one potential write-write error identifies when a variable is written by a first identified rule and written by a second identified rule.

31. The medium according to claim 5, wherein the at least one potential read-write error identifies when a variable is read by a first identified rule and written by a second identified rule.

32. The medium according to claim 5, wherein the at least one potential write-write error identifies when a variable is written by a first identified rule and written by a second. identified ride.

33. The medium according to claim 28, wherein the identifying potential conflicts further comprises identifying a potential conflict, the potential conflict including at least one detected potential read-write error or at least one detected potential write-write error.

34. The system according to claim 33, wherein the at least one potential read-write error identities when a variable is read by a first identified rule and written by a second identified rule.

35. The system according to claim 33, wherein the at least one potential write-write error identifies when a variable is written by a first identified rule and written by a second identified rule.

* * * * *

UNITED STATES PATENT AND TRADEMARK OFFICE
CERTIFICATE OF CORRECTION

PATENT NO. : 8,898,100 B2  Page 1 of 1
APPLICATION NO. : 13/250348
DATED : November 25, 2014
INVENTOR(S) : Mark Grechanik et al.

It is certified that error appears in the above-identified patent and that said Letters Patent is hereby corrected as shown below:

In the Claims

Claim 3, Col. 22, Line 5, "rues" should read as --rules--.

Signed and Sealed this
Twelfth Day of May, 2015

Michelle K. Lee
*Director of the United States Patent and Trademark Office*